US012390004B2

(12) United States Patent
Luhtasela et al.

(10) Patent No.: US 12,390,004 B2
(45) Date of Patent: Aug. 19, 2025

(54) SOUNDPROOF BOOTH AND WALL ASSEMBLY WITH A WORK SURFACE

(71) Applicant: FRAMERY OY, Tampere (FI)

(72) Inventors: Jaakko Luhtasela, Tampere (FI); Ville-Veikko Puolimatka, Tampere (FI); Miika Hällfors, Tampere (FI); Markus Kopf, Tampere (FI)

(73) Assignee: FRAMERY OY, Tampere (FI)

( * ) Notice: Subject to any disclaimer, the term of this patent is extended or adjusted under 35 U.S.C. 154(b) by 210 days.

(21) Appl. No.: 18/032,206

(22) PCT Filed: Oct. 15, 2021

(86) PCT No.: PCT/FI2021/050690
§ 371 (c)(1),
(2) Date: Apr. 17, 2023

(87) PCT Pub. No.: WO2022/084582
PCT Pub. Date: Apr. 28, 2022

(65) Prior Publication Data

US 2023/0399842 A1 Dec. 14, 2023

(30) Foreign Application Priority Data

Oct. 19, 2020 (FI) ..................................... 20206026
Dec. 9, 2020 (FI) ..................................... 20206274

(51) Int. Cl.
*E04B 1/82* (2006.01)
*A47B 5/00* (2006.01)
(Continued)

(52) U.S. Cl.
CPC .................. *A47B 9/04* (2013.01); *A47B 5/00* (2013.01); *A47B 21/06* (2013.01); *E04B 1/8218* (2013.01);
(Continued)

(58) Field of Classification Search
CPC .......... E04B 1/8218; E04H 1/12; E04H 1/125
(Continued)

(56) References Cited

U.S. PATENT DOCUMENTS 2,927,665 A 3/1960 Hauf
3,963,094 A * 6/1976 Nowikas ............... E04B 1/8218 181/198
(Continued)

FOREIGN PATENT DOCUMENTS

CN 210195370 U 3/2020
EP 2301382 A1 3/2011
(Continued)

OTHER PUBLICATIONS

European Patent Office, International Search Report and Written Opinion of the International Searching Authority, Application No. PCT/FI2021/050690, mailed Jan. 26, 2022, 12 pages.
(Continued)

*Primary Examiner* — Christine T Cajilig
(74) *Attorney, Agent, or Firm* — Ziegler IP Law Group LLC.

(57) ABSTRACT

A wall assembly for a soundproof space includes a first layer including sound absorbing material, a vertically oriented elongated mounting element behind or embedded into the first layer, the mounting element providing an adjustment groove for a vertically adjustable work surface, and an incombustible surface behind the first layer. A soundproof booth can include the wall assembly.

16 Claims, 23 Drawing Sheets

(51) Int. Cl.
*A47B 9/04* (2006.01)
*A47B 21/06* (2006.01)
*E04H 1/12* (2006.01)
*E06B 3/06* (2006.01)

(52) U.S. Cl.
CPC ............... *E04H 1/125* (2013.01); *E06B 3/06* (2013.01); *A47B 2200/0056* (2013.01)

(58) Field of Classification Search
USPC .................................................. 52/36.1, 36.2
See application file for complete search history.

(56) References Cited

U.S. PATENT DOCUMENTS

| | | | | | |
|---|---|---|---|---|---|
| 4,702,046 | A * | 10/1987 | Haugen | E04B 1/86 52/144 |
| 5,210,984 | A * | 5/1993 | Eckel | E04B 1/8218 52/270 |
| 6,024,025 | A | 2/2000 | Koch et al. | |
| 9,593,481 | B2 * | 3/2017 | Gosling | A47B 57/06 |
| 9,655,438 | B1 | 5/2017 | Shoenfeld et al. | |
| 9,675,170 | B2 * | 6/2017 | Klinke | A47B 9/04 |
| 9,723,920 | B1 | 8/2017 | Wu | |
| 2013/0264146 | A1 * | 10/2013 | Nason | E06B 5/20 181/290 |
| 2018/0090915 | A1 | 3/2018 | Byrne et al. | |
| 2019/0119902 | A1 * | 4/2019 | Chen | E04B 1/8218 |
| 2021/0148128 | A1 * | 5/2021 | Ko | E06B 5/10 |

FOREIGN PATENT DOCUMENTS

| | | | | |
|---|---|---|---|---|
| KR | 100799284 | B1 | 1/2008 | |
| KR | 20170096410 | A | 8/2017 | |
| NL | 2004139 | C2 | 7/2011 | |
| RU | 198733 | U1 | 7/2020 | |
| WO | 2011063812 | A2 | 6/2011 | |
| WO | WO-2013185141 | A1 * | 12/2013 | A47B 5/00 |
| WO | 2017134341 | A1 | 8/2017 | |
| WO | 2018213062 | A1 | 11/2018 | |

OTHER PUBLICATIONS

European Patent Office, International Search Report and Written Opinion of the International Searching Authority, Application No. PCT/FI2021/050688, mailed Jan. 24, 2022, 14 pages.
Finnish Patent and Registration Office, Office Action, Application No. 20206026, Mailed Sep. 27, 2022, 4 pages.
Finnish Patent and Registration Office, Office Action, Application No. 20206274, Mailed Oct. 6, 2022, 5 pages.
Finnish Patent and Registration Office, Search Report, Application No. 20206026, mailed Apr. 30, 2021, 1 page.
Finnish Patent and Registration Office, Search Report, Application No. 20206274, Mailed Jun. 28, 2021, 2 pages.
Liz, “A Closer Look at Sound Damping vs. Absorption” Technicon Acoustics Sound Science, Posted Sep. 30, 2019, https://www.techniconacoustics.com/blog/sound-damping-vs-absorption/, 5 pages.

* cited by examiner

SOUNDPROOF BOOTH AND WALL ASSEMBLY WITH A WORK SURFACE

FIELD

The present disclosure generally relates to wall assemblies suitable for soundproofing.

BACKGROUND

This section illustrates useful background information without admission of any technique described herein representative of the state of the art.

Soundproof spaces, such as soundproof conference or phone booths, are increasingly used in modern furnishing of workplaces as well as public spaces. Such spaces are often used for working, telephone calls and video conferencing.

Wall structures of such spaces should on the one hand be slim, aesthetic, and easy to assemble and on the other hand provide effective soundproofing, especially against speech, while maintaining a comfortable working environment inside the space. Minimizing the fire load of the structure is also desirable. Furthermore, any appliances or interior elements such as work surfaces of such spaces should preferably be provided without hindering any of the above.

SUMMARY

It is an object of certain embodiments of the invention to provide an improved wall structure or assembly or at least to provide an alternative to existing solutions.

According to a first example aspect of the invention there is provided a wall assembly for a soundproof space, comprising:

- a first layer comprising sound absorbing material;
- a vertically oriented elongated mounting element behind or embedded into the first layer, the said mounting element providing an adjustment groove for a vertically adjustable work surface; and
- an incombustible surface behind the first layer.

In this context the term soundproof space is intended to mean silent working places or similar. The wall assembly should attenuate sound, preferably at least in human speech frequencies, at least to an adequate degree. It is not necessary to stop sound completely.

The term sound absorbing material is intended to mean materials purposely used for sound absorption by dissipating airborne sound waves by the said material (in contrast to damping sound).

In certain embodiments, the sound absorbing material is or comprises porous material. In certain embodiments, the sound absorbing material is or comprises felt material.

The expression "behind" in the context of "behind the first layer" here means "behind" or "at least partly behind" when viewed from the inside of the soundproof space.

In certain embodiments, a purpose of the incombustible surface is to prevent spreading of a potential fire into a volume behind the said incombustible surface.

In certain embodiments, the incombustible surface is immediately behind the first layer (without there being any intervening material layers of the wall assembly in between the first layer and the incombustible surface).

In certain embodiments, the wall assembly comprises a slit providing access to the adjustment groove. In certain embodiments, the slit is vertically oriented, extending in the height direction of the wall assembly.

In certain embodiments, the slit is comprised by the mounting element. In certain embodiments, the mounting element or slit (or a portion of the mounting element comprising the slit) penetrates through the first layer. In certain embodiments, the mounting element or slit (or a portion of the mounting element comprising the slit) penetrates through the sound absorbing material.

In certain embodiments, the mounting element resides in between the first layer and the incombustible surface. In certain embodiments, the sound absorbing material surrounds the mounting element, at least partially.

In certain embodiments, the wall assembly comprises a support for the work surface slidably attached to the adjustment groove.

In certain embodiments, the wall assembly comprises a support for the work surface, the support being slidably attached to the adjustment groove and extending through the slit (and a respective slit or opening in the first layer) to the outside of the first layer.

In certain embodiments, the wall assembly comprises:

- a wall module providing said incombustible surface, the said vertically oriented elongated mounting element being attachable or attached to the wall module.

In certain embodiments, the incombustible surface has a raised edge forming its end portion, the mounting element being attached to the end portion via a mounting arrangement.

In certain embodiments, the mounting arrangement comprises a horizontally extending mounting bar.

In certain embodiments, the wall assembly comprises an air layer in between the mounting element and the incombustible surface for maintaining a distance in between the mounting element and the incombustible surface.

In certain embodiments, the incombustible surface is recessed behind the mounting element. In certain embodiments, the incombustible surface comprises a local recess in the region of the mounting element behind the mounting element. In certain embodiments, this is to enable the mounting element to reside at least partially in the recessed portion (local recess) of the incombustible surface.

In certain embodiments, the incombustible surface is recessed with respect to a planar surface area surrounding the recessed area of the incombustible surface. In certain embodiments, the surface area of the recess behind mounting element is larger than the exact footprint of the mounting element so as to enable the mounting element to fit in with clearance.

In certain embodiments, the wall assembly comprises a first wall, preferably a first wall element of sheet material, providing said incombustible surface.

In certain embodiments, the material of the first wall (element) is sheet metal.

In certain embodiments, the wall assembly comprises a second wall, preferably a second wall element of sheet material, forming a wall module with the first wall, wherein the first and second walls are joined together at end portions of the module to form an enclosure therebetween. In certain embodiments, the enclosure is formed of sheet material.

In certain embodiments, the wall assembly comprises sound absorbing material within the enclosure. In certain embodiments, the sound absorbing material is or comprises porous material.

In certain embodiments, the wall assembly comprises:

- an air layer within the enclosure in between the sound absorbing material and either of the first and the second wall elements.

In certain embodiments, the wall assembly comprises:

a vertical support member extending vertically from within the mounting element to outside the mounting element;

an electrical cable wound around the vertical support element, the vertical support element allowing the electrical cable to alternate between its contracted and extended states.

In certain embodiments, the wall assembly comprises:

a wall module having a first wall and a second wall joined together at end portions of the module to form an enclosure therebetween; and sound absorbing material within the enclosure, wherein the enclosure is formed of said first wall and said second wall, and wherein the wall module provides the incombustible surface.

In certain embodiments, the enclosure extends between end portions of the wall module. In certain embodiments, the first and second walls are front (or innermost) and rear (or outermost) walls of the wall module. In certain embodiments, the wall module is of a general shape of a rectangle. In certain embodiments, the first and second walls are joined at each side of the rectangle.

In certain embodiments, the wall module provides an incombustible surface. Accordingly, in certain embodiments, at least one of the first wall and the second wall provides an incombustible surface. In certain embodiments, both the first wall and the second wall provide an incombustible surface. In certain embodiments, the first wall is of metal. In certain embodiments, the second wall is of metal.

In certain embodiments, the wall assembly comprises:

a first wall element of sheet material forming the first wall and a second wall element of sheet material forming the second wall.

In certain embodiments, the enclosure is merely limited by said sheet material(s). Accordingly, the structure is implemented without discrete additional end portions made of, for example, wood. In certain embodiments, the enclosure is a unitary enclosure substantially having the width and height of the wall module. In certain embodiments, the enclosure substantially covers the whole area of a side wall of a soundproof space or booth.

In certain embodiments, the first and second walls are of fireproof material, and preferably of incombustible material. In certain embodiments, the first and second walls are of material generally considered as sound stopping material.

In certain embodiments, the wall module is a self-contained module. In certain embodiments, the wall module provides a wall module-wide incombustible surface (both sideways and in vertical dimensions). In certain embodiments, the formed enclosure is a fireproof structure.

In certain embodiments, the end portions of the module comprise attachment regions at which the first wall and the second wall are joined together.

In certain embodiments, the wall assembly comprises end portions of the first and second wall superimposed on each other for attachment.

In certain embodiments, one of the first and second walls comprises a curved or bent portion directing that wall towards the other for attachment.

In certain embodiments, the said other wall also comprises a curved or bent portion to cause the end portions of the first and second walls to lie one on top of the other for attachment.

In certain embodiments, the wall assembly comprises the first and second wall joined together at their end portions with at least one clinching joint.

In certain embodiments, the wall module provides a module-wide recess and raised edges thereto formed by the first wall to place the first layer comprising sound absorbing (optionally porous) material at least partly inside of the recess.

In certain embodiments, the wall assembly comprises the wall module configured for attaching a door frame or window frame to the wall module at an end portion of the wall module.

In certain embodiments, the wall assembly comprises:

an air layer within the enclosure in between the sound absorbing material and either of the first and the second walls.

In certain embodiments, the air layer extends over the whole surface of the sound absorbing material that faces the first or second wall. Accordingly, the whole surface of the sound absorbing material that faces the wall in question is out of touch with that wall.

In certain embodiments, the wall assembly comprises:

a cover of sheet material covering the second wall.

In certain embodiments, the wall assembly comprises:

a volume for wirings in between the second wall and the cover.

In certain embodiments, the wall assembly comprises:

a volume for electrical components in between the second wall and the cover.

In certain embodiments, the said volume for wirings or electrical components is implemented in the form of at least one recess.

In certain embodiments, the first wall and the second wall are sheet metal elements.

In certain embodiments, the wall module comprises an attaching element, such as a latch, for attaching another structural element, such as a roof module or a floor module, to the wall module.

In certain embodiments, the wall assembly comprises the attaching element at a region of the wall module in which the first wall and the second wall have been joined together.

According to a second example aspect of the invention there is provided a soundproof booth, comprising the wall assembly of the first aspect or any of its embodiments.

In certain embodiments, the soundproof booth is a phone booth. In certain embodiments, the soundproof booth is a soundproof meeting pod or a silent workplace.

In certain embodiments, the soundproof booth comprises structural modules, including the said wall assembly or module, attached to each other to form a structure encircling the soundproof space.

In certain embodiments, the soundproof booth comprises a door frame attached to said encircling structure for attaching a door.

In certain embodiments, the wall module comprised by the wall assembly extends from a side frame to another side frame (or extends in between the said frames). In certain embodiments, the wall module further extends from a floor module to a roof module.

According to a further example aspect there is provided a wall module for the wall assembly of the first aspect or for any of its embodiments, the wall module having a first wall and a second wall joined together at end portions of the module to form an enclosure therebetween; and sound absorbing material within the enclosure, wherein the enclosure is formed of said first wall and said second wall, and wherein the wall module (e.g., first or second wall, or both the first and second wall) provides an incombustible surface.

As an alternative aspect, there is provided a wall assembly for a soundproof space, comprising a wall module having a first wall and a second wall joined together at end portions of the module to form an enclosure therebetween; and sound absorbing material within the enclosure, wherein the enclosure is formed of said first wall and said second wall, and wherein the wall module (e.g., first or second wall, or both the first and second wall) provides an incombustible surface.

In certain embodiments, the wall module is provided with a vertically oriented elongated mounting element attachable or attached to the wall module, the said mounting element providing an adjustment groove for a vertically adjustable work surface.

In certain embodiments, the wall module or assembly is provided with a vertical support member extending vertically from within the mounting element to outside the mounting element;

an electrical cable wound around the vertical support element, the vertical support element allowing the electrical cable to alternate between its contracted and extended states.

According to a further example aspect there is provided an adjustment mechanism assembly for a soundproof booth, for a wall module, or for a wall assembly for adjusting a work surface position vertically, comprising a vertical guiding element (or a vertically oriented elongated mounting element), a work surface support element (or support for a work surface) engaged with the vertical guiding element and configured to be movable vertically with electric actuation, means for said electric actuation comprising a cable, and a vertical support member which extends vertically from within the vertical guiding element to outside the vertical guiding element, which cable comprises a spiraled (or wound) portion between its termini, which spiraled portion is supported with respect to its central axis by the vertical support member.

In certain embodiments, the spiraled portion is configured to extend and contract with vertical movement of the work surface support element. Advantageously, said extending and contracting is in the longitudinal direction of the spiraled or wound portion.

In certain embodiments, the work surface support element is adapted to provide support for a work surface, such as a table top.

In certain embodiments, the means for electric actuation comprises an electrical user interface and a control unit connected with the cable to the electrical user interface. In certain embodiments, the means for electric actuation comprises an electrical user interface, a control unit connected with the cable to the electrical user interface, and at least one actuator, such as motor, effecting the movement of the work surface support element and connected to the control unit.

In certain embodiments, the adjustment mechanism assembly comprises an electrical user interface and a control unit or an equivalent connection point connected with the cable to the electrical user interface. In certain embodiments, the cable, en route from the electrical user interface to the control unit or an equivalent connection point, and before the spiraled portion, enters into inside the vertical guiding element at the work surface support element.

In certain embodiments, at least a portion of the spiraled portion of the cable resides outside the vertical guiding element.

In certain embodiments, the vertical guiding element comprises an aperture through which the vertical support mechanism extends vertically from within the vertical guiding element to the outside the vertical guiding element. In certain embodiments, at least a portion of the spiraled portion of the cable extends through the aperture and resides outside the vertical guiding element.

In certain embodiments, the cable is arranged to enter into inside of the vertical guiding element at the work surface support element.

In certain embodiments, that end portion of the vertical support member which resides outside the vertical guiding element is connected to a support element configured to prevent movement of said end portion of the vertical support member.

In certain embodiments, that end of the vertical support member which resides outside the vertical guiding element is connected to a support element adapted to hold said end of the vertical support member in place.

In certain embodiments, the adjustment mechanism assembly comprises at least two strain relievers connected to the cable such that the spiraled portion of the cable resides between two strain relievers.

In certain embodiments, the support element comprises one of said two strain relievers, the work surface support element comprises another of said two strain relievers, and the spiraled portion of the cable resides between these two strain relievers.

In certain embodiments, the vertical support member is a rod and the spiraled portion of the cable is spiraled around the rod.

In certain embodiments, the adjustment mechanism assembly comprises a further or additional vertical guiding element, and a further or additional work surface support element engaged with the further or additional vertical guiding element and configured to be movable vertically. In certain embodiments, the adjustment mechanism assembly comprises more than one vertical guiding element and respective work surface support elements are engaged to respective vertical guiding elements.

In certain embodiments, the adjustment mechanism assembly comprises at least one mounting support element connected to the vertical guiding element(s) and adapted for mounting the adjustment mechanism assembly for example to a mounting surface, such as a wall.

In certain embodiments, the wall assembly or wall module of foregoing aspects comprises or is provided with the preceding adjustment mechanism assembly or any of its features.

Different non-binding example aspects and embodiments have been illustrated in the foregoing. The embodiments in the foregoing are used merely to explain selected aspects or steps that may be utilized in different implementations. Some embodiments and features may be presented only with reference to certain example aspects. It should be appreciated that corresponding embodiments and features apply to other example aspects as well. In particular, the embodiments and features described in the context of the first aspect are applicable to each further aspect, and vice versa. Any appropriate combinations of the embodiments may be formed. Any apparatus and/or methods in the description and/or figures not covered by the claims are examples useful for understanding the invention.

BRIEF DESCRIPTION OF THE FIGURES

Some example embodiments will be described with reference to the accompanying figures, in which.

DETAILED DESCRIPTION

Figure 1:
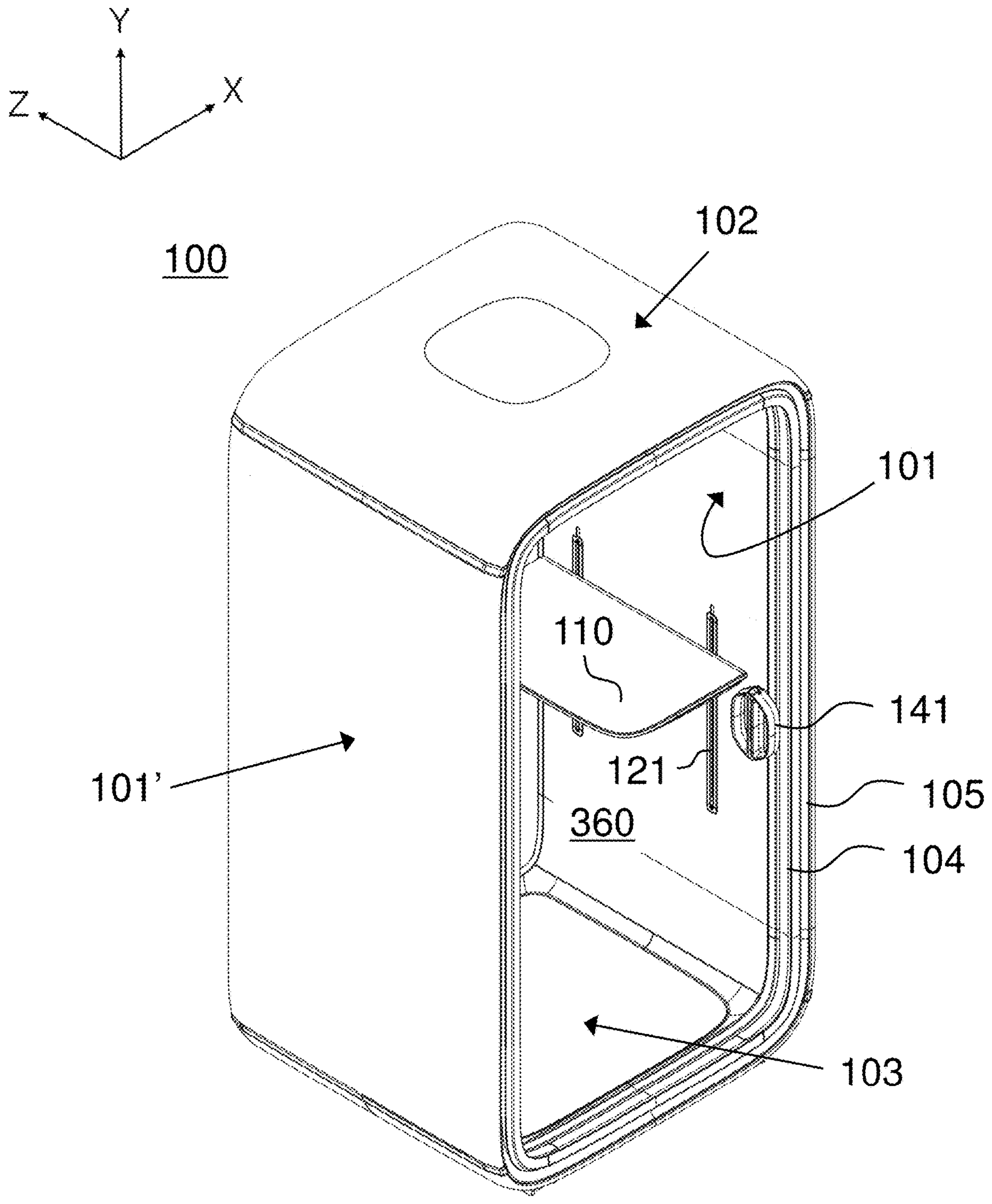
FIG. 1 shows a soundproof booth in accordance with certain embodiments.

In the following description, like reference signs denote like elements or steps. Reference is made to the FIGS. 1-18 with the following numerals and denotations:

100 Soundproof booth
101, 101' Wall module
102 Roof module
103 Floor module
104 Door
104' Window
105, 105' Door frame or window frame
110 Work surface
120 Mounting element with adjustment groove
121 Slit
123 Support for the work surface
141 Door handle
161*a*, 161*b* Mounting arrangement: mounting bars
311 Wall element of sound absorbing material
312 First wall
312*e* End portion of the first wall
313, 313*a* Sound absorbing material layers
314 Air layer
315 Second wall
315*e* End portion of the second wall
316 Cover
317 Air gap
321 Volume for wirings and/or electrical components
322 Stiffening groove
325 Attachment region
335 Local recess
330, 530 Marked portion
360 Soundproof space
710 Clinching joint
910, 920 Attaching element: latch
930 Mounting recess
1230 Marked portion
1530, 1730 Marked portion Further reference is made to the FIGS. 19-26*b* with the following numerals and denotations:

1 Adjustment mechanism assembly
2 Cable, for electrical user interface connectivity
2' Spiraled portion, of cable
3 Vertical support member, for spiraled portion, of cable
3*a* Rod, -type of vertical support member, for spiraled portion, of cable
4 Support element, for vertical support member
5, 5*a*, 5*b* Mounting support element
6, 6*a*, 6*b* Vertical guiding element
7 Control unit
8, 8*a*, 8*b* Work surface support element
9 Work surface
10 Electrical user interface

11 Electrical socket
12 Data connection socket
13 Network connection socket
14 Height adjustment control
15 Control
16 Wireless charging element
20 Mounting surface
21 Wall structure
22 Concealment cover
23 Leg, for the adjustment mechanism assembly
30 Threaded rod
31 Motor
40 Aperture
41 Strain reliever, for cable
C Central axis, of spiraled portion, of cable
L Effective length, for spiraled portion, of cable FIG. 1 shows a soundproof booth 100 that encloses a soundproof space 360 in accordance with certain embodiments. The booth 100 is formed of structural modules. Two opposite wall modules 101, 101' are connected by a roof module 102 and a floor module 103. A frame 105 attached to said modules forms a door opening of the form of a rounded rectangle, and a door 104 (which in itself may comprise another frame) is hingedly attached to the frame 105. The door 104 optionally comprises a door handle 141. In certain embodiments, the booth 100 further comprises a window 104' (not denoted in FIG. 1) at the back side of the booth 100.

The booth 100 comprises a work surface 110 attached via a vertical slit 121 to a wall assembly comprising the wall module 101 (in a practical embodiment this is achieved by extending a support for the work surface through the slit 121).

Figure 2:
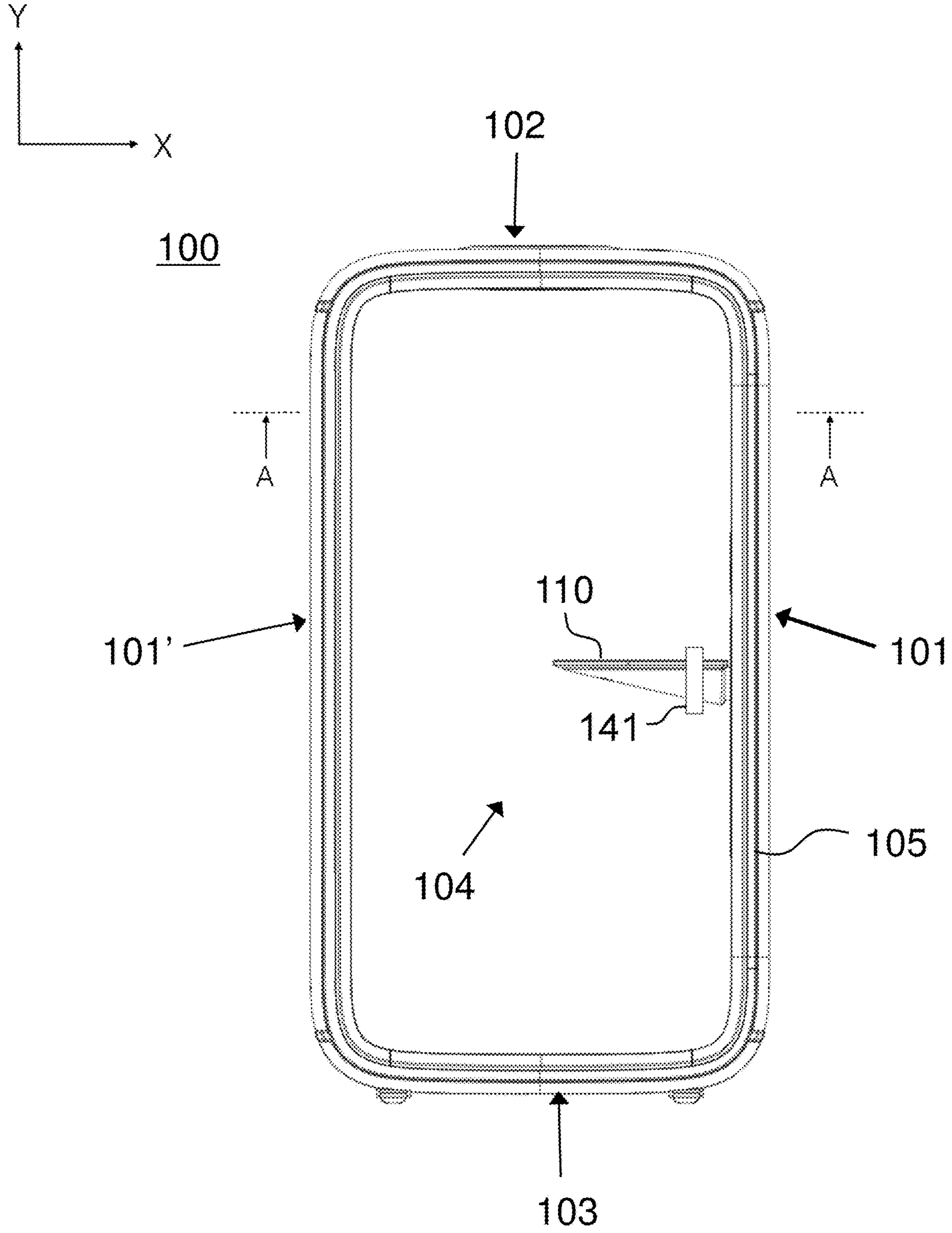
FIG. 2 shows a front view of the soundproof booth of FIG. 1.

FIG. 2 shows a front view of the soundproof booth of FIG. 1. Hereto it is noted that whilst each of the FIGS. 1-18 illustrate the soundproof booth 100 in accordance with its different embodiments, the booth 100 itself and its features may vary in between the Figures. Some features may not be presented in each and all of the Figures, and some of the features may be presented in a different level of abstraction between Figures, and also the level of detail within the one and the same Figure may vary. An example illustration of section A-A drawn in FIG. 2 is shown in FIG. 3 as a cross-sectional view.

Figure 3:
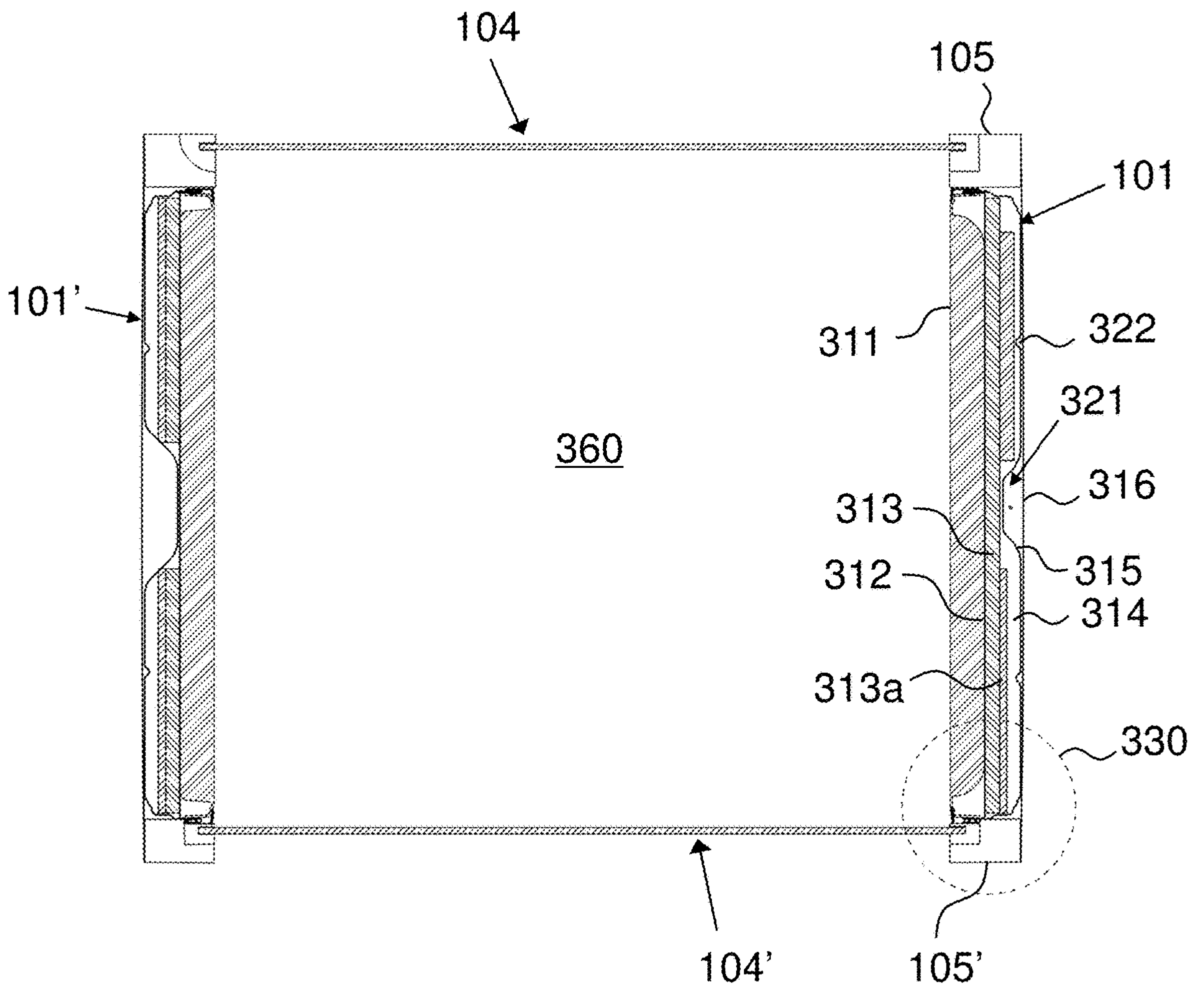
FIG. 3 shows a cross-sectional view of the soundproof booth taken at section A-A in accordance with certain embodiments.

The cross-section shown in FIG. 3 depicts a wall assembly for a soundproof space 360 that is provided by the soundproof booth 100. The wall assembly comprises the wall module 101 having a first wall 312 and a second wall 315 joined together at end portions of the wall module 101. The first and second walls 312, 315 form an enclosure therebetween. In certain embodiments, the first wall 312 is formed of a first wall element of sheet material, such as sheet metal. In certain embodiments both the first wall 312 and the second wall 315 are formed of wall elements of sheet material, such as sheet metal.

The wall assembly comprises sound absorbing material within the enclosure. In certain embodiments, the sound absorbing material within the enclosure is provided in one or more layers, for example, in at least two layers as shown in FIG. 3. A first layer 313 of sound absorbing material is positioned against the first wall 312, and a second layer **313*a* of sound absorbing material is positioned adjacent to the first layer 313. An optional air layer 314 is arranged in between the sound absorbing material and the second wall 315, for example in between the second layer 313*a* and the second wall 315. Alternatively, the air layer 314 may be arranged in between the sound absorbing material and the first wall 312**.

The air layer 314 enhances sound attenuation in certain embodiments especially with higher sound frequencies by materially decoupling the walls 312, 315. This is advantageous in the case of attenuating human speech in which high sound frequencies are most consequential with respect to intelligibility and bystander disturbance. For this purpose, geared towards attenuating human speech in particular, the width (in the direction from the first wall 312 to the second wall 315) of the air layer 314 is preferably in the range of 30-50 mm for human speech-optimal sound attenuation.

The wall assembly further comprises a wall element 311 of sound absorbing, optionally porous, material in between the first wall 312 of the wall module 101 and the soundproof space 360. In certain embodiments, the wall element 311 is in contact with the first wall 312. In certain embodiments, the wall element 311 forms an outer(most) surface of the wall assembly on the side of the soundproof space 360 and faces the inside of the soundproof space 360. Accordingly, in certain embodiments, the wall element 311 is the innermost element of the assembly i.e. the element closest to the inside of the soundproof space 360. In certain embodiments, this wall element 311 is an upholstery panel.

On the other side of the module 101, the wall assembly comprises a cover 316 as the outermost (optional) layer. In certain embodiments, the cover 316 covers the second wall 315. In certain embodiments, the cover 316 is of metal. In certain embodiments, the cover 316 is of sheet material, such as sheet metal.

In certain embodiments, the wall assembly comprises a volume 321 for wirings in between the second wall 315 and the cover 316. The volume 321 may be in the form of a vertically extending groove.

Providing a volume 321 for wirings between the second wall 315 and the cover 316 is advantageous in that thereby wirings and/or any other electrical components can be housed within an enclosed space without providing a separate enclosure for them. Furthermore, in embodiments in which the second wall 315 and the cover 316 are incombustible, the wirings and/or any other electrical components can be housed even more advantageously within an incombustible enclosed space without providing a separate incombustible enclosure for them.

In certain embodiments, the second wall 315 further comprises a stiffening groove 322 extending, for example, vertically along the second wall 315. In an alternative embodiment, an X-shaped stiffening groove is implemented in the plane of the second wall 315.

In certain embodiments, the wall element 311 and the cover 316 do not form part of the module 101.

In certain embodiments, the wall module 101 is configured to extend in between two frames, such as from a first frame 105 to a second frame 105'. In certain embodiments, the first frame 105 is a door frame at a front side corner region of the booth 100 and the second frame 105' is a window frame at a rear side corner region of the booth 100.

Figure 4:
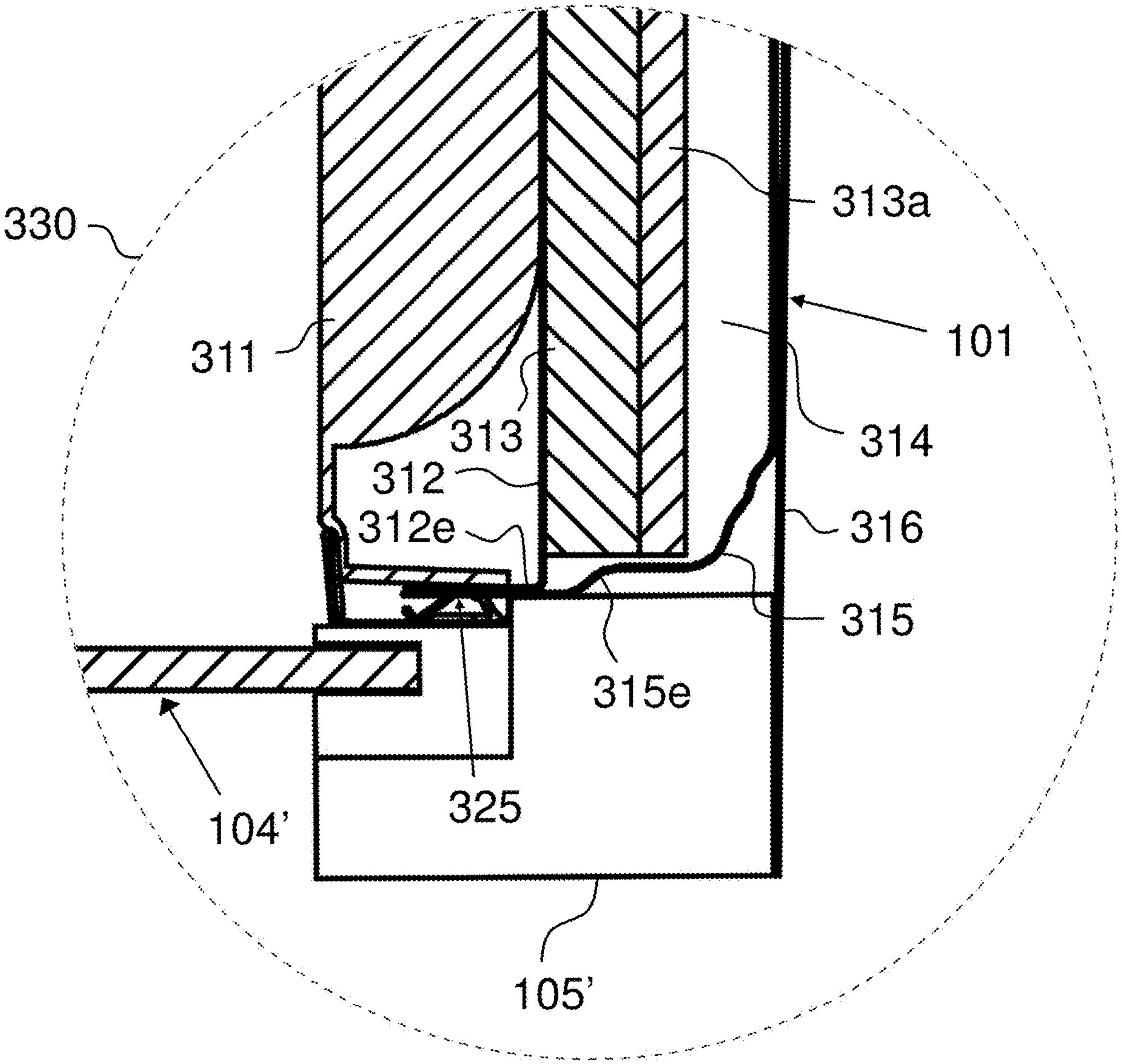
FIG. 4 shows a magnified view of a portion marked in FIG. 3.

FIG. 4 shows a magnified view of a portion 330 marked in FIG. 3. The end portions of the module 101 comprise attachment regions 325 at which the first wall 312 and the second wall 315 are joined together. End portions **312*e*, 315*e* of the first and second walls 312, 315 are superimposed on each other at the attachment region 325 for attachment. In certain embodiments, the second wall 315 comprises a curved or bent portion directing that wall 315 towards the other wall 312 for attachment. In certain embodiments, the first wall 312 also comprises a curved or bent portion causing the end portions of the first and second walls 312, 315** to lie one on top of the other for attachment.

Figure 5:
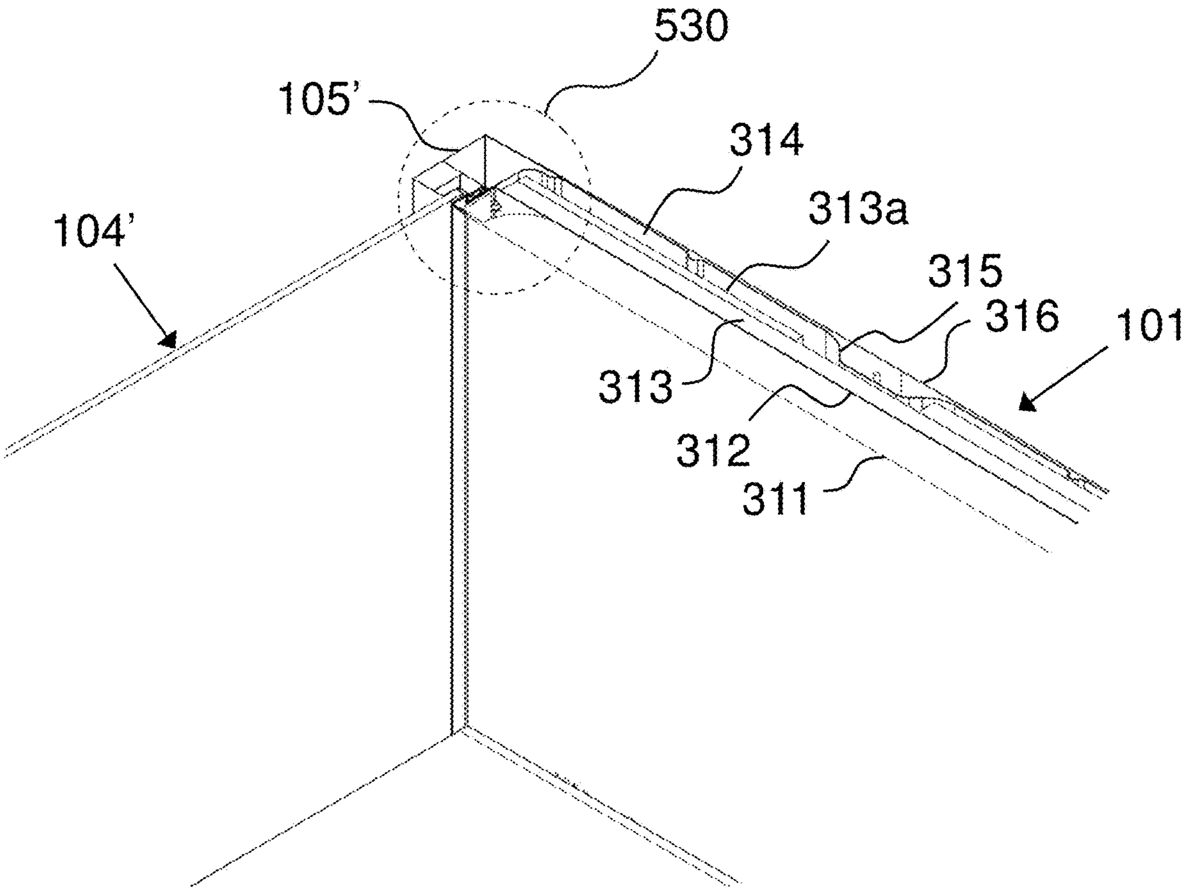
FIG. 5 shows a perspective cross-sectional view of the soundproof booth in accordance with certain embodiments.
Figure 6:
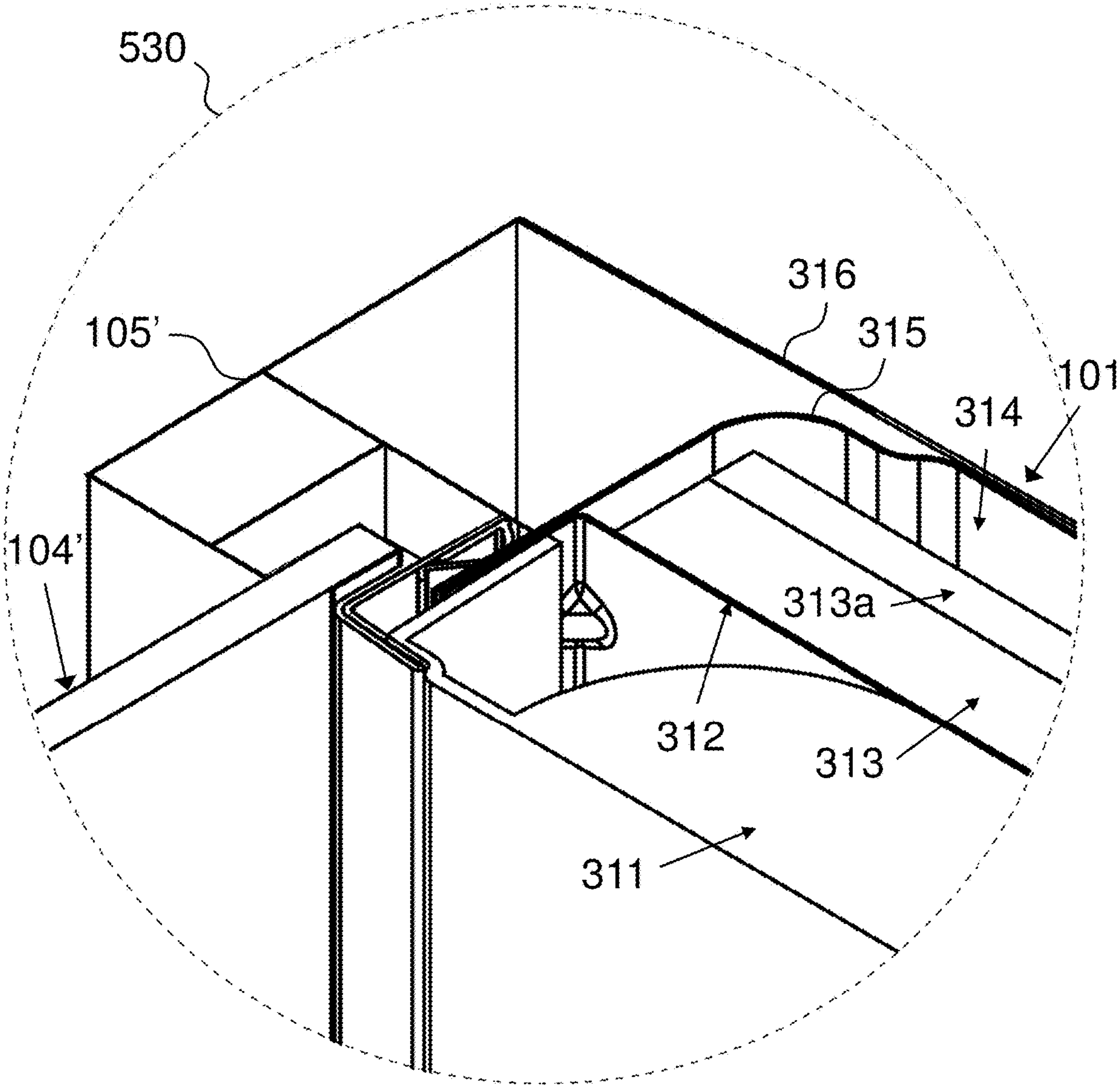
FIG. 6 shows a magnified view of a portion marked in FIG. 5.

FIG. 5 shows a perspective cross-sectional view of the soundproof booth 100 in accordance with certain embodiments, and FIG. 6 shows a magnified view of a portion 530 marked in FIG. 5 (basically corresponding to portion 330 shown in FIGS. 3 and 4 but as viewed from a different perspective). As to the structure shown in FIGS. 5 and 6 a reference is made to the preceding explanation regarding the two-dimensional representation of similar elements in FIGS. 3 and 4.

Figure 7:
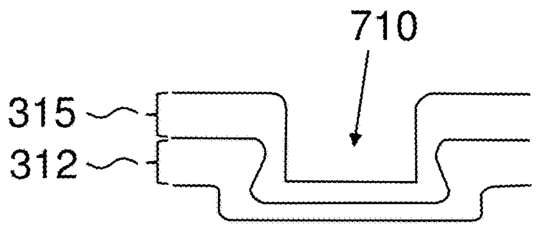
FIG. 7 shows a clinching joint joining a first wall and a second wall together in accordance with certain embodiments.

In certain embodiments, the first and second wall 312, 315 are joined together at their end portions 312*e*, 315*e* with at least one clinching joint. FIG. 7 shows a cross section of a clinching joint 710. To form such a clinching joint 710, a punch is positioned on a first side of the walls 312, 315 (or on the surface of either wall 312 or 315) and a die on the other side. The punch locally pushes the walls 312, 315 into the die and forms a kind of button that provides a mechanical interlock holding the walls 312, 315 together. The result is shown in FIG. 7. Such joining by a clinching joint 710 or several clinching joints 710 is advantageous in that it does not require any additional attachment parts, thereby simplifying the structure, does not require any potentially combustible chemicals such as adhesives, and does not introduce thermal deformations to the structure as would be the case with e.g. welding.

Figure 8:
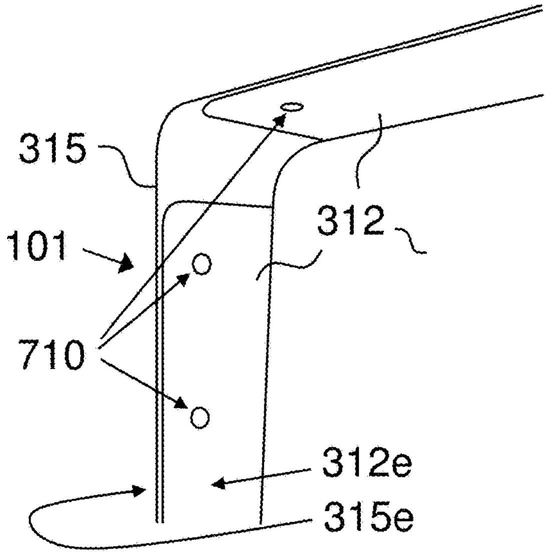
FIG. 8 shows certain details of a wall module of the soundproof booth in accordance with certain embodiments.

FIG. 8 depicts the wall module 101 with end portions 312*e*, 315*e* of the first and second walls 312, 315 joined together with clinching joints 710. The wall module 101 provides a module-wide recess and raised edges thereto formed by the first wall 312. In certain embodiments the raised edges lie in a right angle with respect to a (preferably planar) bottom of the said recess. In certain embodiments, the disclosed structure has room for the wall element 311 to be placed at least partly inside of the recess. The said enclosure behind the first wall 312 (not shown in FIG. 8) is closed sideways by the joint between the walls 312, 315. Similarly, in the vertical direction the walls 312 and 315 are joined together at vertical end portions thereof.

In certain embodiments, the first wall 312 provides an incombustible surface. By joining the first wall 312 and the second wall 315 together at the end portions of the wall module 101 the sound absorbing material within the enclosure can be left out from a calculated fire load of the structure, thereby improving fireproofing of the booth 100 while simultaneously providing the wall module 101 with soundproofing. In addition, or alternatively, by arranging the first wall 312 to provide an incombustible surface, the fire load of the wall module 101 can be decreased and/or the fire performance of the wall module 101 increased, as the first wall 312 is not combustible and protects the subsequent layers against combustion, while simultaneously providing the wall module 101 with soundproofing. The same applies, mutatis mutandis, if the second wall 315 provides an incombustible surface.

Figure 9:
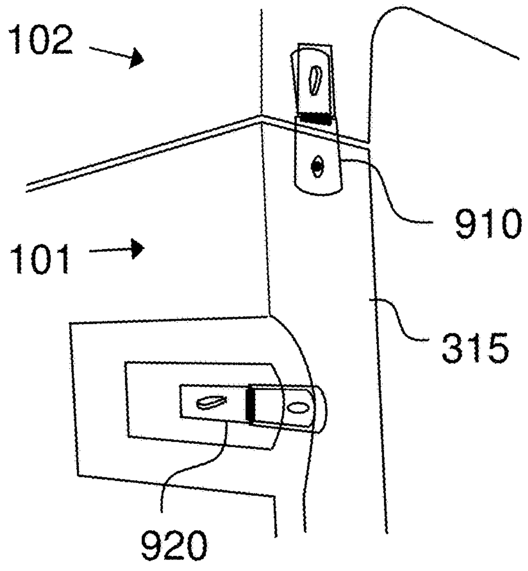
FIG. 9 shows a schematic view of the soundproof booth at the connection area in which a wall module connects with a roof module in accordance with certain embodiments.

In certain embodiments, the wall module 101 comprises an attaching element 910, a quick coupling element, such as a latch, for attaching another structural element, such as a roof module 102 or a floor module 103, to the wall module 101. FIG. 9 shows such an attaching element 910 attaching the wall module 101 to a roof module 102. In certain embodiments, the attaching element 910 resides at a region of the wall module 101 in which the first wall 312 and the second wall 315 are joined together with the benefit of providing a structurally more rigid attachment surface for the attaching element 910.

Figure 10:
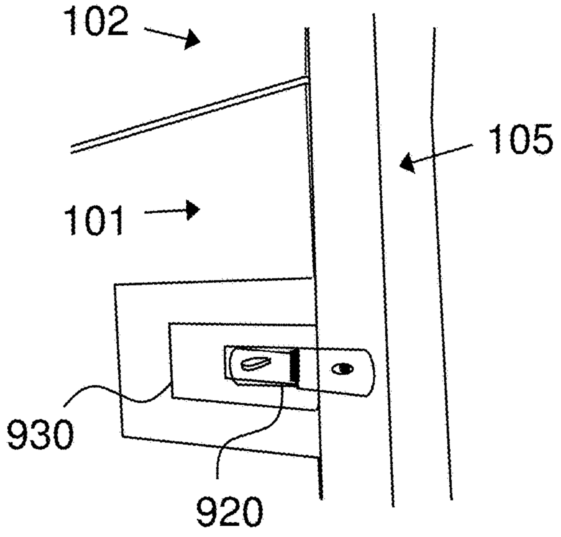
FIG. 10 shows the soundproof booth with a door frame attached in accordance with certain embodiments.

FIG. 10 shows the soundproof booth 100 with a door (or window) frame 105 attached to the wall module 101 at an end portion of the wall module 101 in accordance with certain embodiments. The wall module 101 comprises an attaching element 920, a quick coupling element, such as a latch, for attaching the frame 105 to the wall module 101. In certain embodiments, the attaching element 920 is positioned in a mounting recess 930 arranged in the wall module 101. In certain embodiments, the mounting recess 930 is arranged in the second wall 315. Such a mounting recess 930 is advantageous in that by housing the attaching element 920 in a mounting recess 930, a possible cover 316 may be attached on the outer surface of the wall module 101 with the attaching element 930 not protruding outwards from the outer surface plane of the wall module 101.

Figure 11:
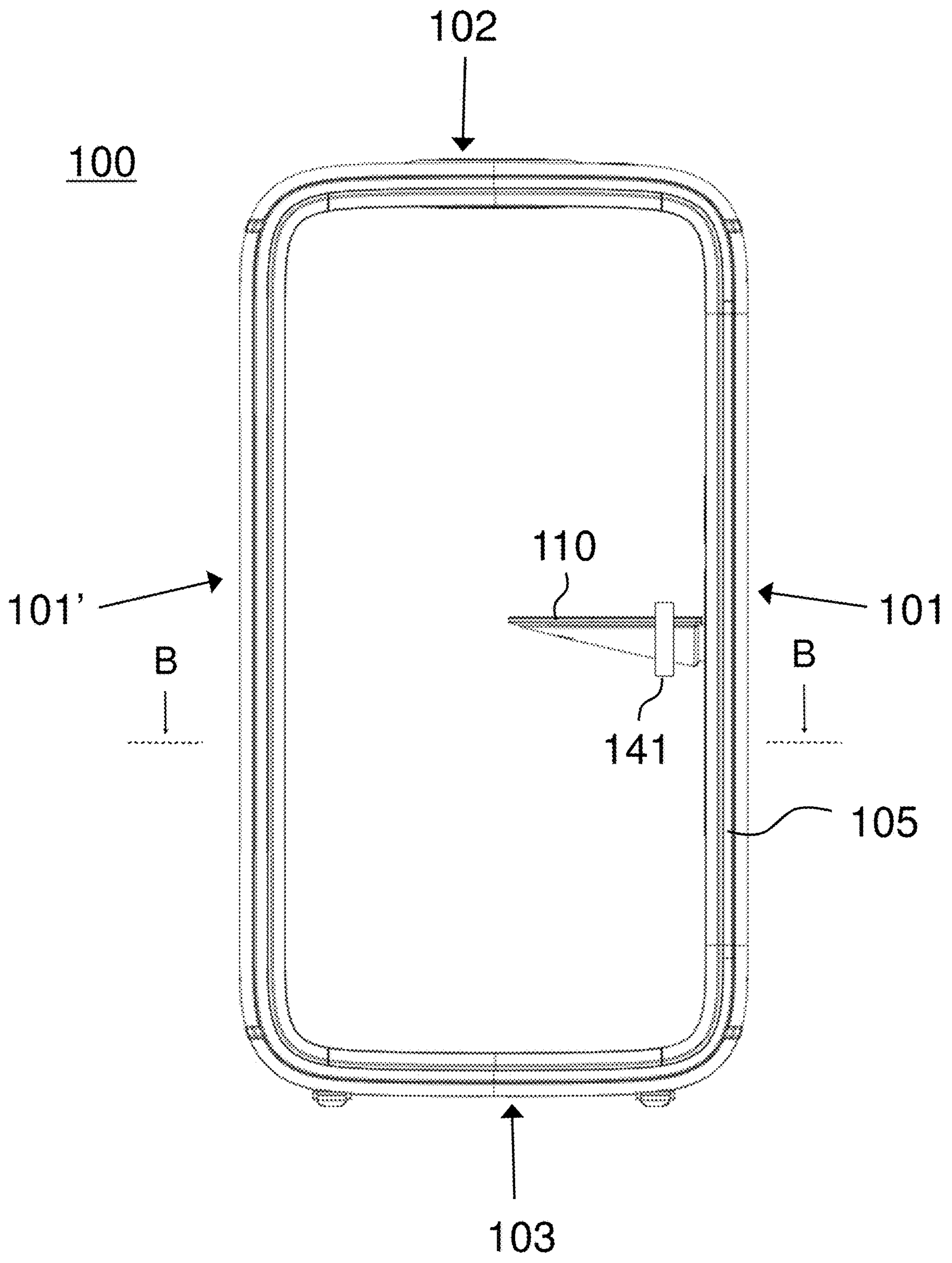
FIG. 11 shows a further front view of the soundproof booth in accordance with certain embodiments.

FIG. 11 shows a further front view of the soundproof booth in accordance with certain embodiments. A section B-B drawn in FIG. 11 is shown in FIG. 12 as a cross-sectional view.

Figure 12:
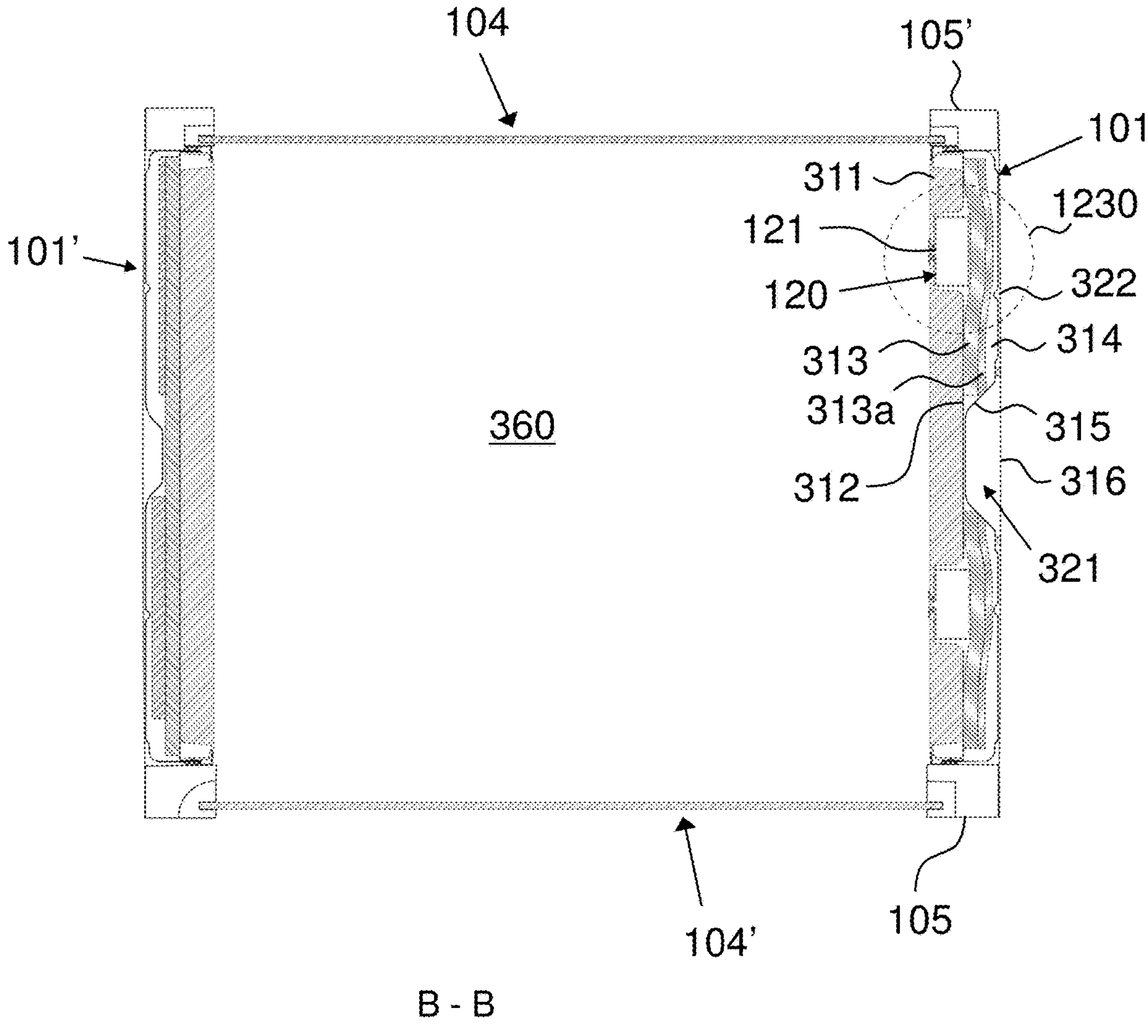
FIG. 12 shows a cross-sectional view of the soundproof booth taken at section B-B in accordance with certain embodiments.

The cross-section shown in FIG. 12 depicts a wall assembly for a soundproof space 360 that is provided by the soundproof booth 100. The wall assembly comprises a first layer comprising sound absorbing (optionally porous) material, that is, the layer or wall element 311. The wall assembly further comprises a vertically oriented elongated mounting element 120 embedded into the first layer 311, the said mounting element 120 providing an adjustment groove for the vertically adjustable work surface 110 (not shown in FIG. 12). In certain embodiments, the mounting element 120 is positioned completely or partly behind the first layer 311. In one such an embodiment, the first layer 311 is of felt material or other thin material which is preferably sound absorbing. The wall assembly further comprises an incombustible surface behind the first layer 311, that is, the first wall 312 behind the first layer 311.

In certain embodiments, the wall assembly comprises a slit 121 providing access to the adjustment groove. In certain embodiments, the slit 121 is vertically oriented, extending in the height direction of the wall assembly. In certain embodiments, the slit 212 faces the soundproof space 360.

As to further features, the wall assembly described herein optionally comprises features described in the foregoing with reference to FIGS. 3-10. Accordingly, a reference is made to the preceding description as to the other features. Similar reference numerals have been used.

In particular, the wall assembly in certain embodiments comprises the wall module 101 having the first wall 312 and second wall 315 joined together at end portions of the module 101, and forming the enclosure therebetween. And, in certain embodiments, the wall assembly comprises sound absorbing material (see 313, 313*a*) within the enclosure. Furthermore, in certain embodiments, the wall assembly comprises the air layer 314 within the enclosure in between the sound absorbing material and either of the first and the second walls 312, 315. Furthermore, in certain embodiments, the wall assembly comprises a cover 316, preferably of metal or of sheet material such as sheet metal, covering the second wall 315.

In certain embodiments, the incombustible surface is immediately behind the first layer 311 (without there being any intervening material layers of the wall assembly in between the first layer 311 and the incombustible surface).

In certain embodiments, the wall assembly comprises an air gap 317 in between the mounting element 120 and the incombustible surface to provide a clearance in between the mounting element 120 and the incombustible surface in order to prevent rattling of the incombustible surface against the mounting element 120. This can be seen better in FIG. 13 which shows a magnified view of a portion 1230 marked in FIG. 12. The required clearance depends on the implementation. As a general rule the clearance should be more than the largest interval between the mounting element 120 and the incombustible surface that still allows the mounting element 120 and the incombustible surface to hit against each other during use (which would then cause a rattling sound). In an alternative embodiment, the mounting element 120 is fixedly attached to the incombustible surface (wall 312) in the region of the mounting element 120 in a way that does not allow the mounting element 120 hit the incombustible surface during use and thus does not allow the formation of a rattling sound.

In certain embodiments, the incombustible surface is recessed behind the mounting element 120. In certain embodiments, the incombustible surface comprises a local recess 335 in the region of the mounting element 120 behind the mounting element 120. In certain embodiments, this is to enable the mounting element 120 to reside at least partially in the recessed portion (local recess) 335 of the incombustible surface. This is advantageous in that the wall assembly may thereby be made slimmer than without the mounting element 120 residing at least partially in the local recess 335, while simultaneously maintaining soundproofing and fireproofing performance of the wall module 101. The form of the recess 335 depends on the implementation. In certain embodiments, the incombustible surface is recessed with respect to a planar surface area surrounding the recessed area of the incombustible surface. In certain embodiments, the surface area of the recess 335 behind mounting element 120 is larger than the exact footprint of the mounting element 120 so as to enable the mounting element 120 to fit in, at least partially, optionally with clearance for ease of installation and lesser requirements for manufacturing tolerances.

The local recess 335 enables the space between the first wall 312 and the second wall 315, i.e., the enclosure comprising sound absorbing material to be relatively thicker except for those areas where the mounting element 120 resides. Further the local recess 335 enables an implementation in which the first layer (interior or upholstery panel) 311 does not have to be as thick as the mounting element(s) 120.

Furthermore, the local recess 335 enables the above-mentioned advantages without the first wall 312 being cut or penetrated through, whereby the soundproofing and/or soundproofing performance of the first wall 312 remains intact.

Figure 14:
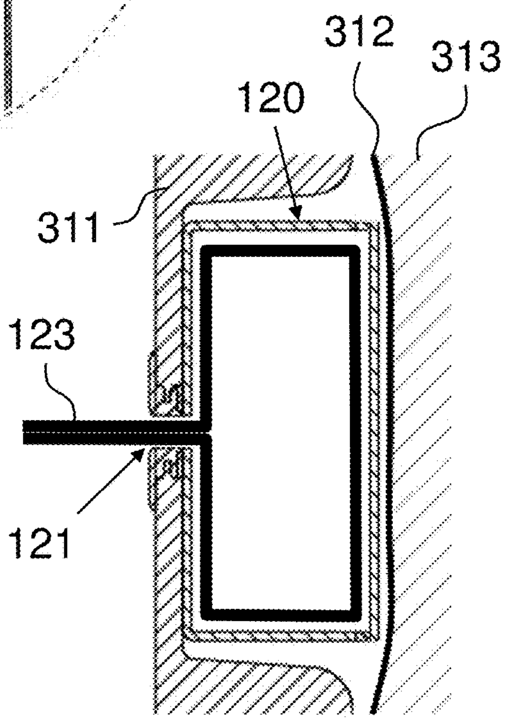
FIG. 14 shows a support for a work surface within an adjustment groove in accordance with certain embodiments.

In certain embodiments, the wall assembly comprises at least one support 123 of for the work surface slidably attached to the adjustment groove provided by the mounting element 120 as depicted by FIG. 14. In certain embodiments, the support 123 of the work surface 110 extends through the slit 121 to the outside of the first layer 311 (the first layer 311 comprises a corresponding slit or opening).

Figure 15:
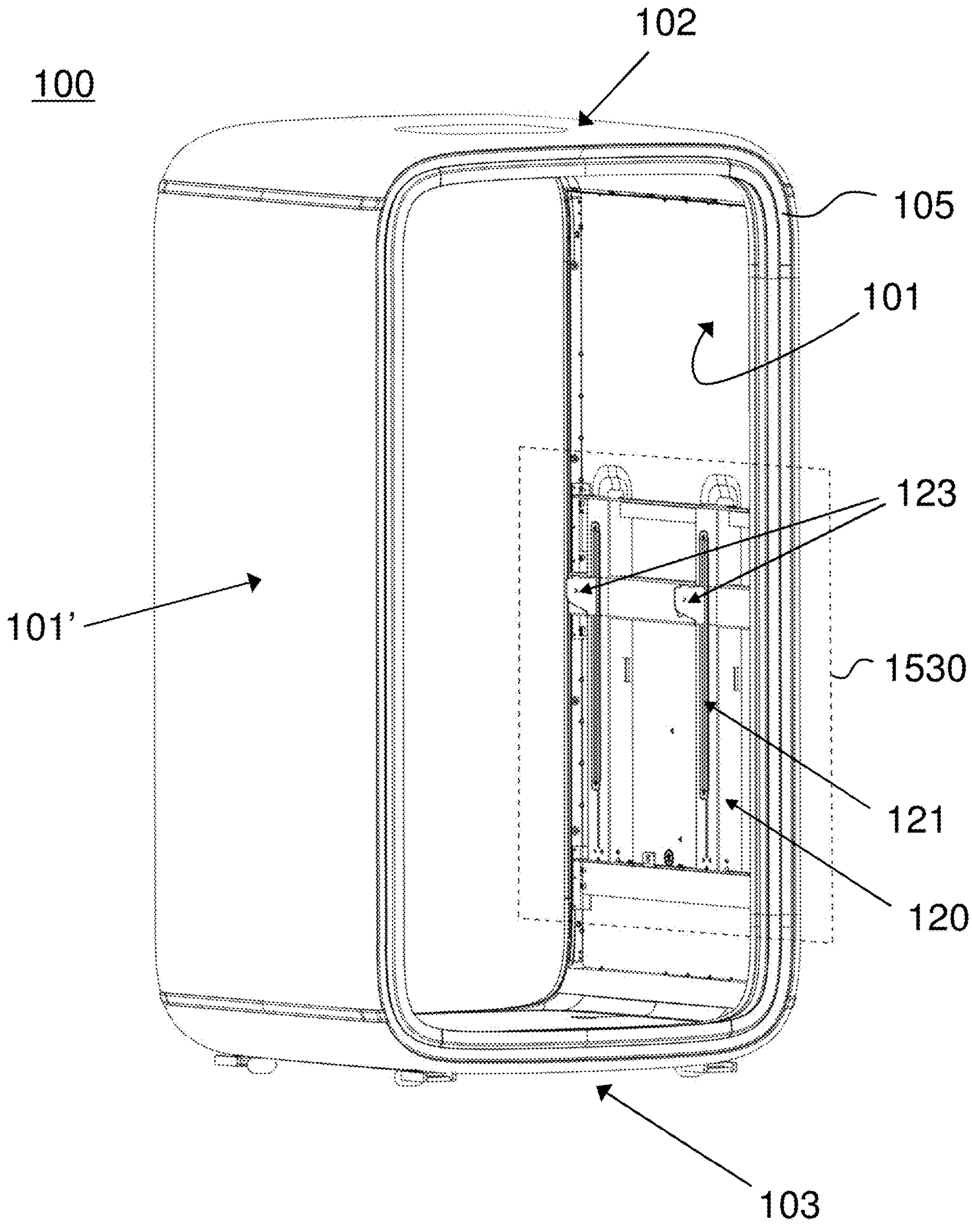
FIG. 15 shows a partial perspective view of the soundproof booth provided with supports for a vertically adjustable work surface in accordance with certain embodiments.
Figure 16:
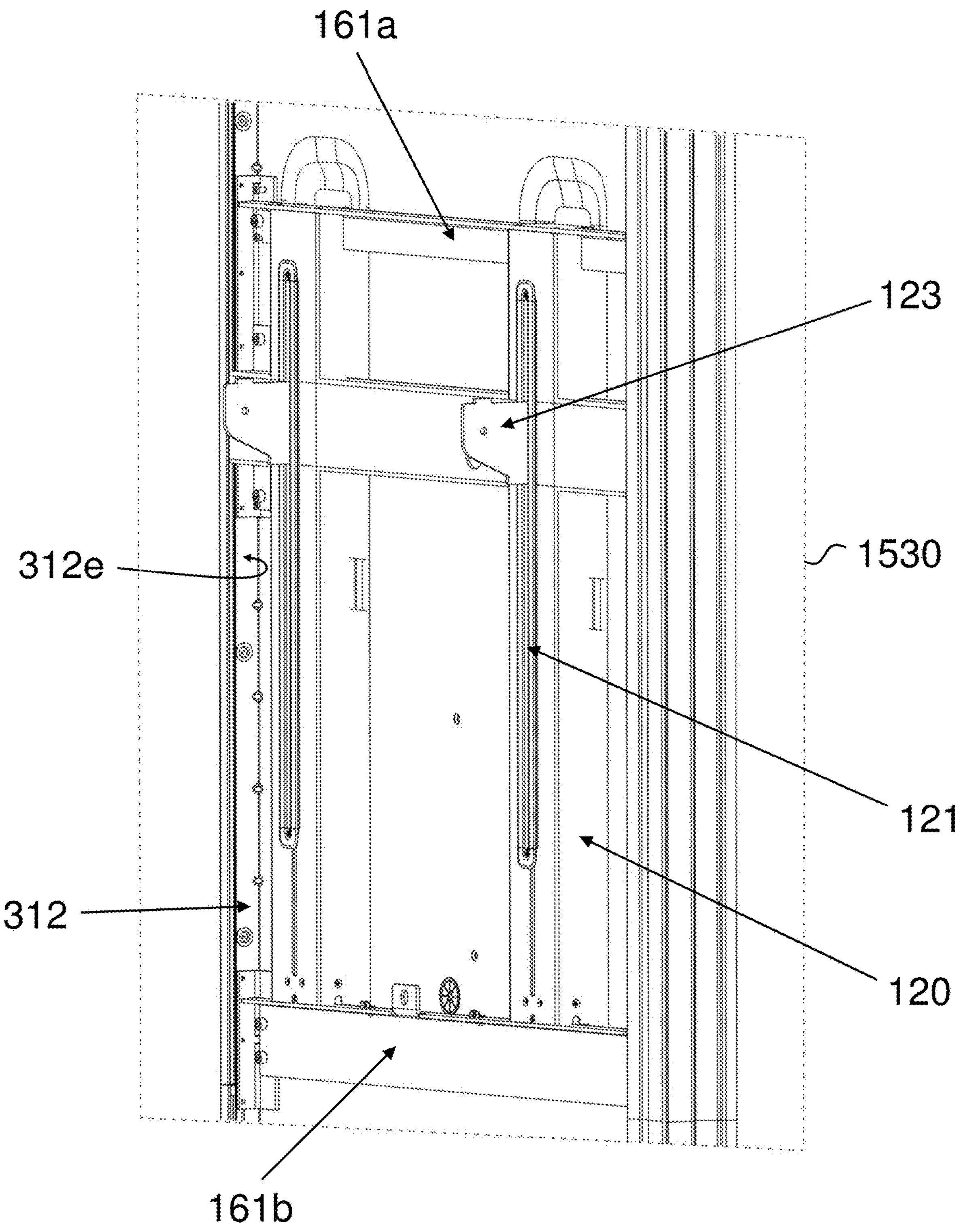
FIG. 16 shows a magnified view of a portion marked in FIG. 15.

FIG. 15 shows a partial perspective view of the soundproof booth 100 provided with supports 123 for the vertically adjustable work surface 110 (not shown) in accordance with certain embodiments, and FIG. 16 shows a magnified view of a portion 1530 marked in FIG. 15.

Two vertically oriented elongated mounting elements 120 are positioned in parallel providing the adjustments grooves inside them, and providing the vertically extending slits 121 at their front sides facing towards the soundproof space 360. The first layer 311 has not been drawn in FIGS. 15 and 16. Further the door 104 and back window 104' have not been drawn in FIGS. 15 and 16.

In certain embodiments, the incombustible surface (first wall 312) has a raised edge forming its end portion 312*e*, with the mounting element(s) 120 being attached to the end portion 312*e* by a mounting arrangement. In certain embodiments, such as shown in FIGS. 15 and 16, the mounting arrangement comprises horizontally extending mounting bars 161*a*, 161*b* attaching the mounting element(s) 120 to the end portion(s) 312*e* of the incombustible surface.

Figure 13:
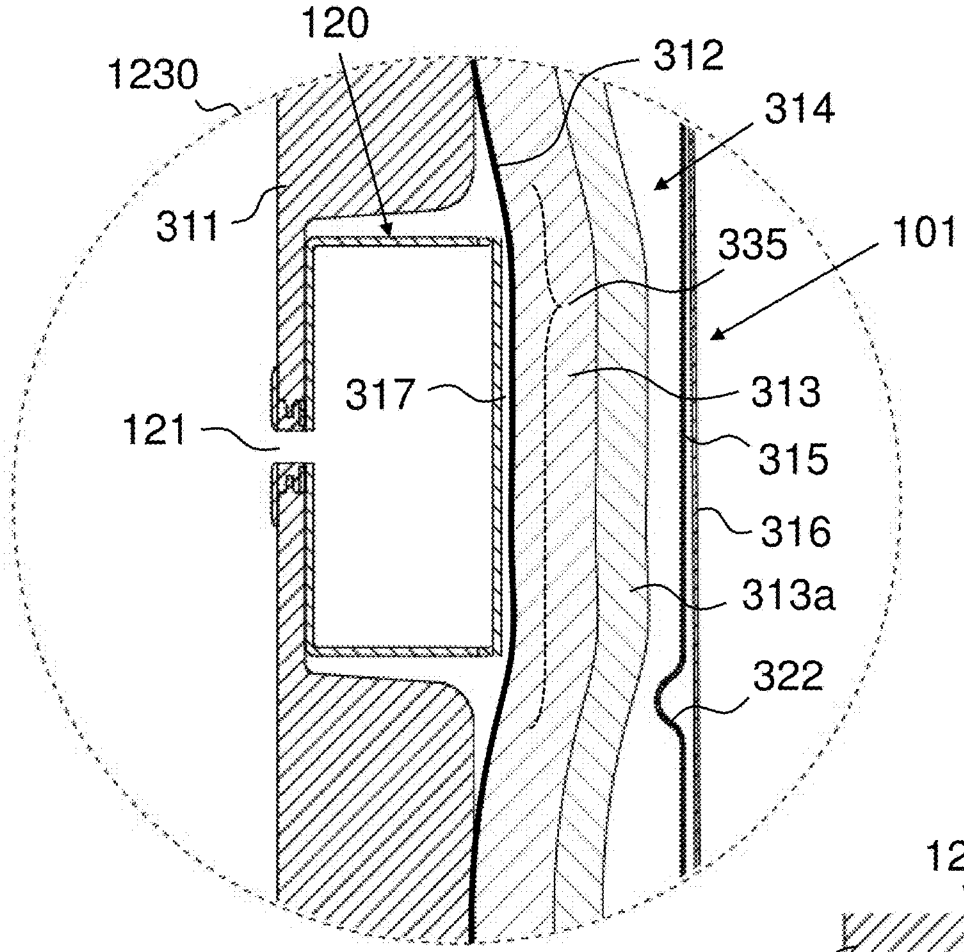
FIG. 13 shows a magnified view of a portion marked in FIG. 12.
Figure 17:
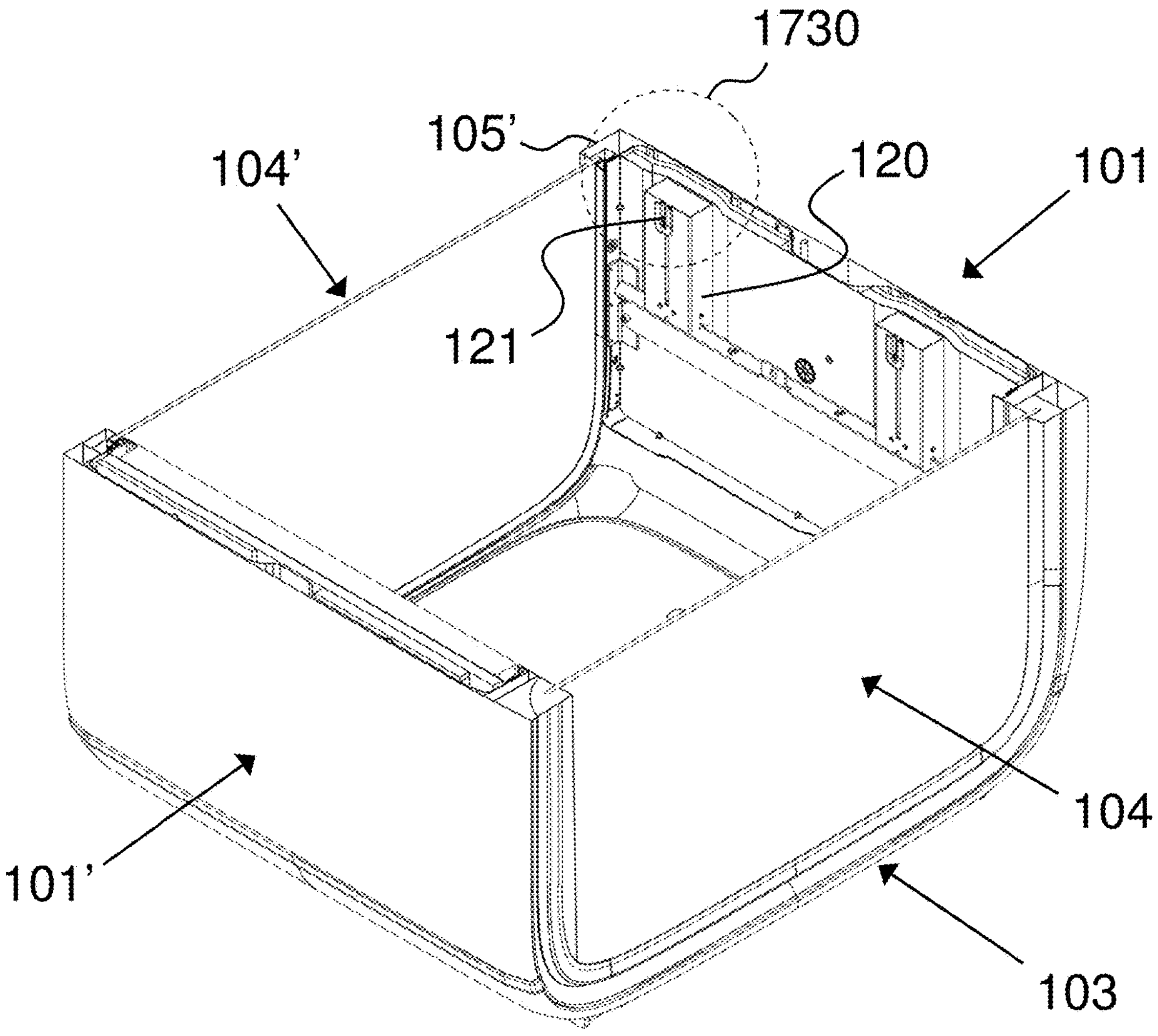
FIG. 17 shows a partial perspective cross-sectional view of the soundproof booth depicting a lower section of its wall module and the adjustment groove in accordance with certain embodiments.
Figure 18:
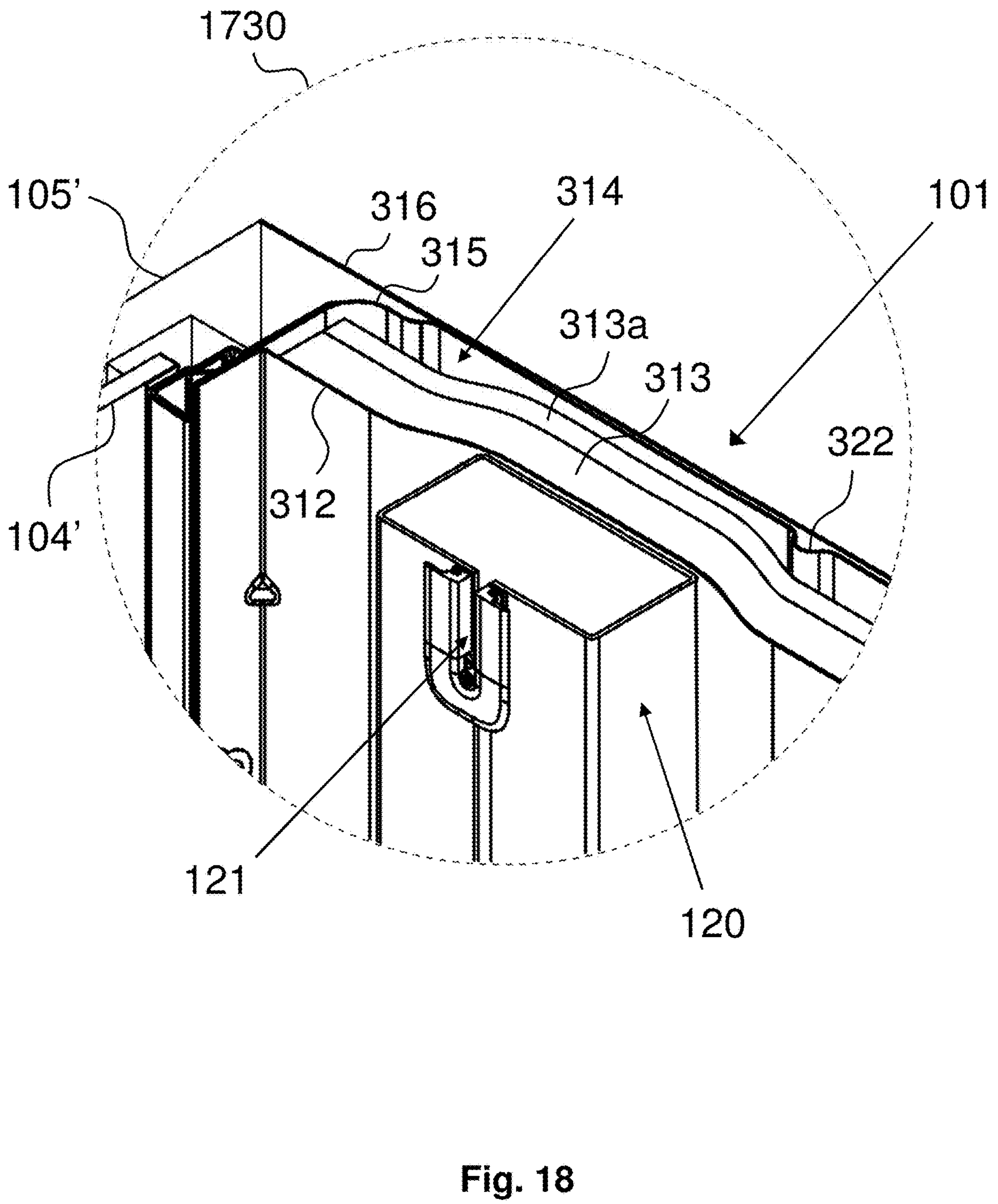
FIG. 18 shows a magnified view of a portion marked in FIG. 17.

FIG. 17 shows a partial perspective cross-sectional view of the soundproof booth 100 depicting a lower section of its wall module 101 and the adjustment groove in accordance with certain embodiments, and FIG. 18 shows a magnified view of a portion 1730 marked in FIG. 17 (basically corresponding to portion 1230 shown in FIGS. 12 and 13). The first layer 311 has not been drawn in FIGS. 17 and 18. As to the structure shown in FIGS. 17 and 18 a reference is made to the preceding explanation regarding the two-dimensional representation of similar elements in FIGS. 12 and 13.

FIGS. 19-26*b* illustrate further embodiments, especially embodiments of an adjustment mechanism assembly suitable for use in the soundproof booth of the type shown in the foregoing or in connection with the wall assemblies or wall modules described in the foregoing.

Such an adjustment mechanism assembly for adjusting a work surface position vertically, comprises

- a vertical guiding element 6,
- a work surface support element 8 engaged with the vertical guiding element 6 and configured to be movable vertically with electric actuation,
- means for said electric actuation comprising a cable 2, and
- a vertical support member 3 which extends vertically from within the vertical guiding element 6 to outside the vertical guiding element 6,
- which cable 2 comprises a spiraled or wound portion 2' between its termini, which spiraled or wound portion 2' is supported with respect to its central axis C by the vertical support member 3.

Figure 22:
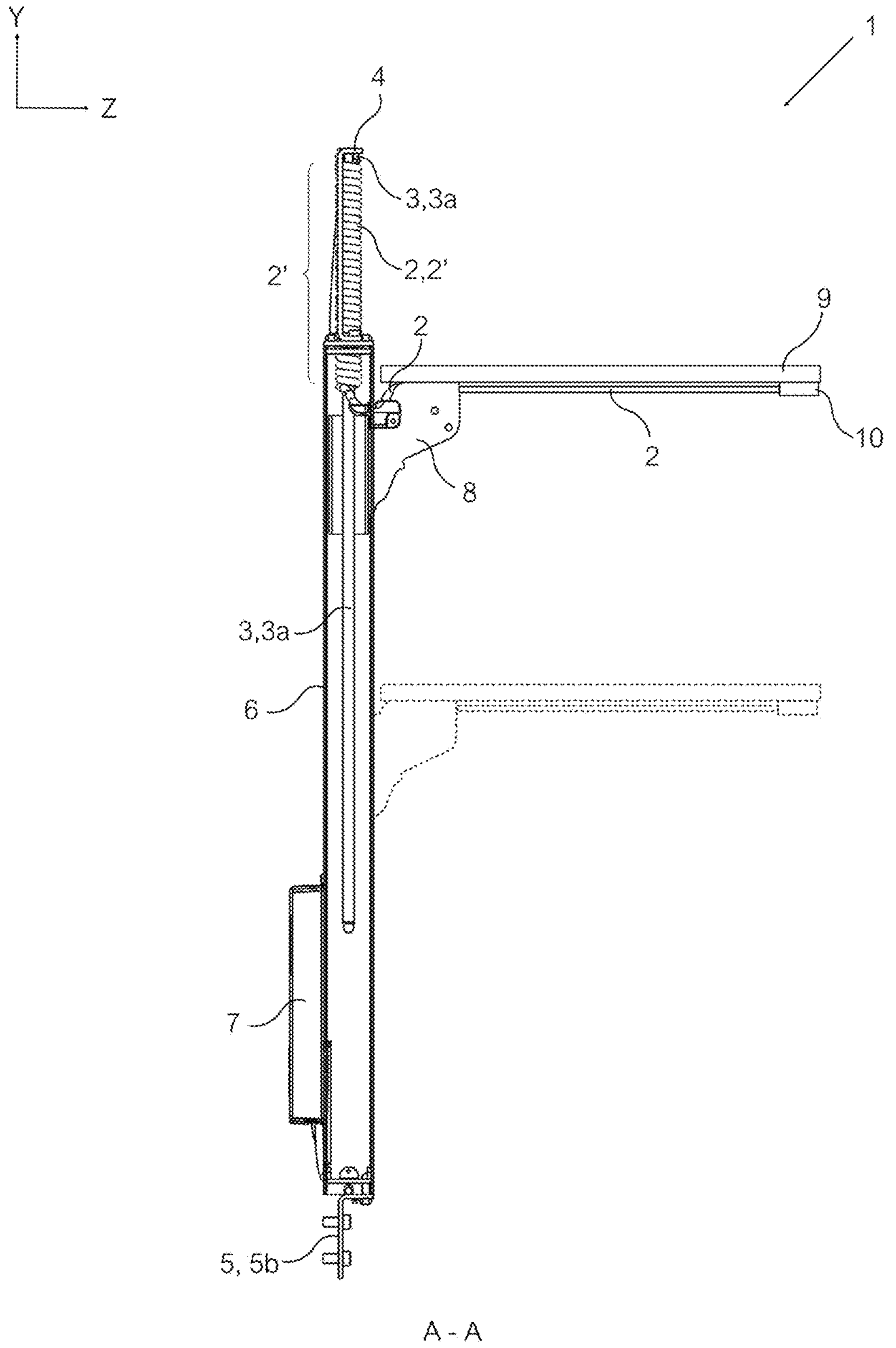
FIG. 22 schematically illustrates the adjustment mechanism assembly of FIG. 19 plus a work surface with a cable connected electrical user interface, as viewed from a side and in a cross-section denoted in FIG. 19, and wherein work surface movement is illustrated by way of depicting another exemplary position for the work surface with dashed lines.

An adjustment mechanism assembly 1 for electrically adjusting a vertical position of a work surface 9 connectable to the adjustment mechanism assembly 1, for example, is shown in the embodiment of FIG. 22. Thus, the disclosed solution comprises an adjustment mechanism assembly 1 for e.g. electrically adjusting the height of a table.

Figure 19:
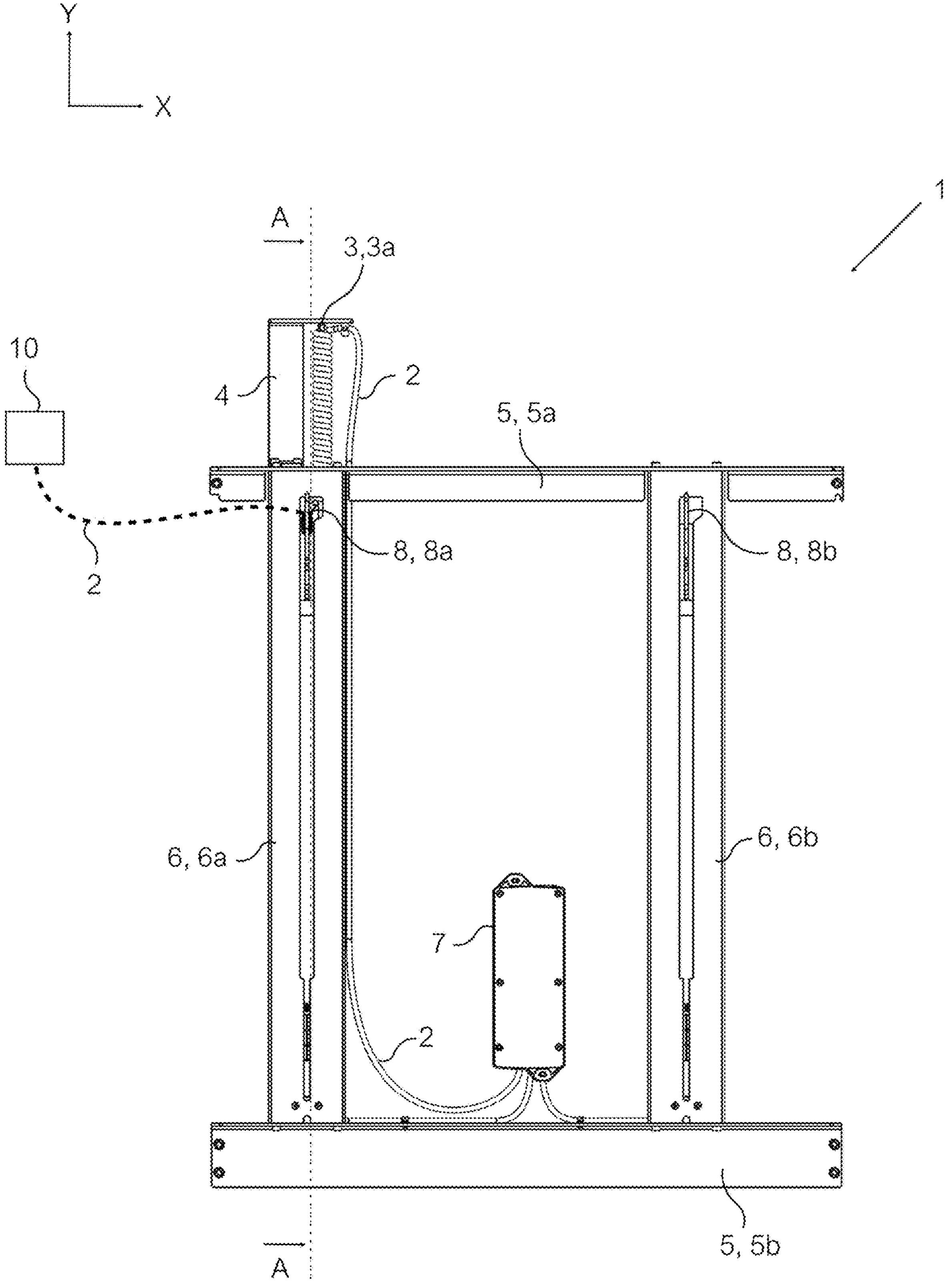
FIG. 19 schematically illustrates, according to an example embodiment, an adjustment mechanism assembly according to the disclosed solution as viewed from the front.

The adjustment mechanism assembly 1 comprises at least one vertical guiding element 6 (the mounting element 120 in the foregoing) advantageously providing attachment and/or movement guidance for a work surface support element 8 (the support 123 in the foregoing) or several work surface support elements 8 to which a work surface 9 (work surface 110 in the foregoing) may be attached, for example as shown in the embodiment of FIG. 19. The vertical guiding element 6 may be provided with, or comprise, a slit (slit 121 in the foregoing) through which at least a part of the work surface support element 8 may extend into the vertical guiding element 6 for connection or engagement therein.

Figure 21:
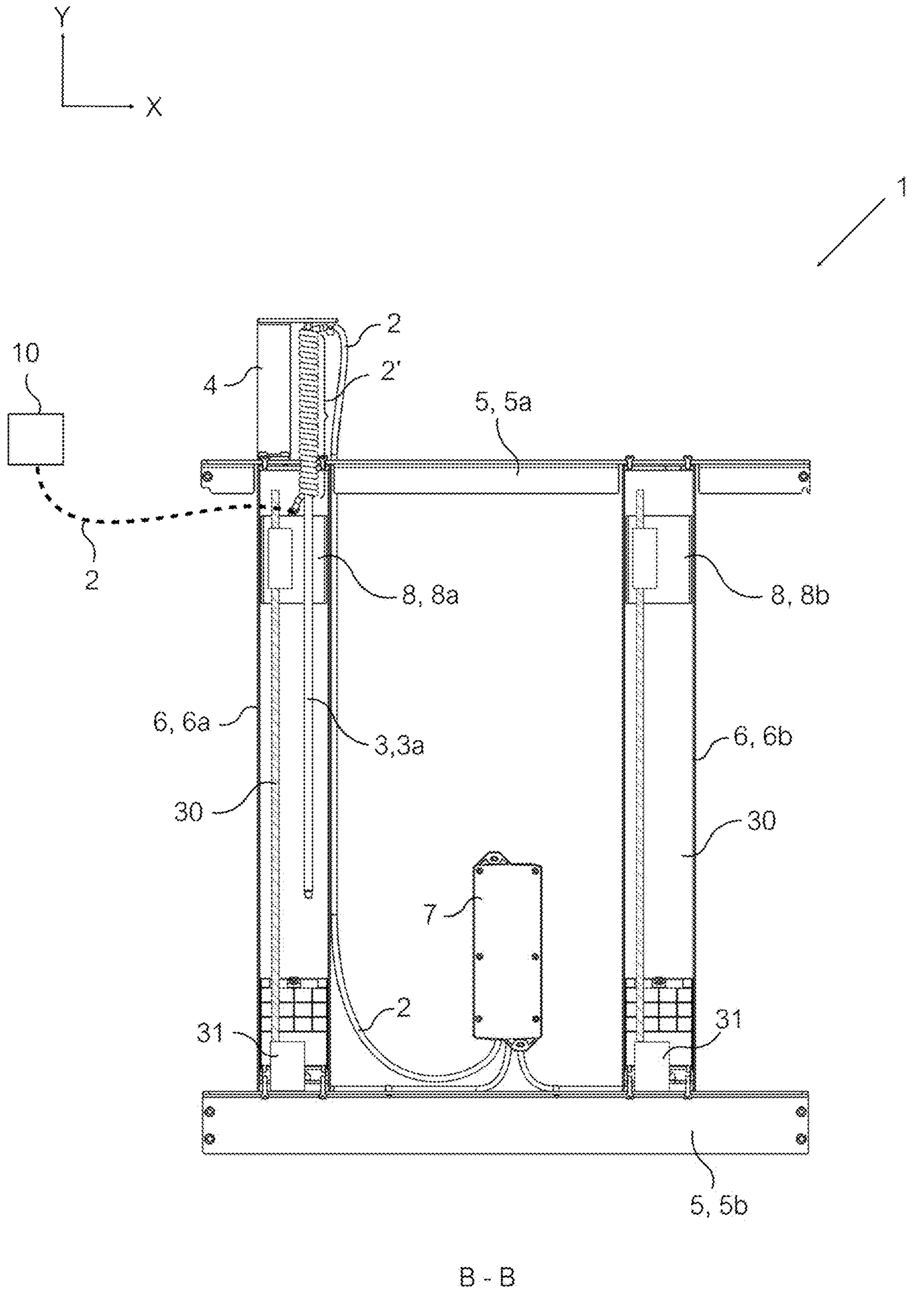
FIG. 21 schematically illustrates the adjustment mechanism assembly of FIG. 19 as viewed from the front and in a cross-section denoted in FIG. 20.

The vertical guiding element 6 may, for example within it, comprise a mechanism for providing movement for the work surface support element 8. For example as shown in the embodiment of FIG. 21, the vertical guiding element 6 may, for example within it, comprise a threaded rod 30 which extends through the work surface support element 8, for example through the portion of the work surface support element 8 that is housed within the vertical guiding element 6. In such embodiments, the portion of the work surface support element 8 through which the treated rod 30 extends may comprise threads configured to interconnect with the threaded rod 30 so that when the threaded rod 30 rotates, the work surface support element 8 moves accordingly.

In certain embodiments, the adjustment mechanism assembly 1 comprises one vertical guiding element 6. Such a setup is advantageous in e.g. applications in which small size for the adjustment mechanism assembly 1 is desired.

In certain other embodiments, for example as shown in the embodiments of FIGS. 19 and 21, the adjustment mechanism assembly 1 comprises two vertical guiding elements 6*a*, 6*b*. Such a setup is advantageous in e.g. applications in which it is advantageous to have the work surface 9 supported at or near both its ends to prevent the work surface 9 from wobbling or tilting.

In certain yet other embodiments, the adjustment mechanism assembly 1 comprises three or more vertical guiding elements 6. Such a setup is advantageous in e.g. applications in which it is advantageous to provide great amount of lifting or supporting force for a heavy work surface 9 or a work surface 9 with heavy objects on it.

Figure 25A:
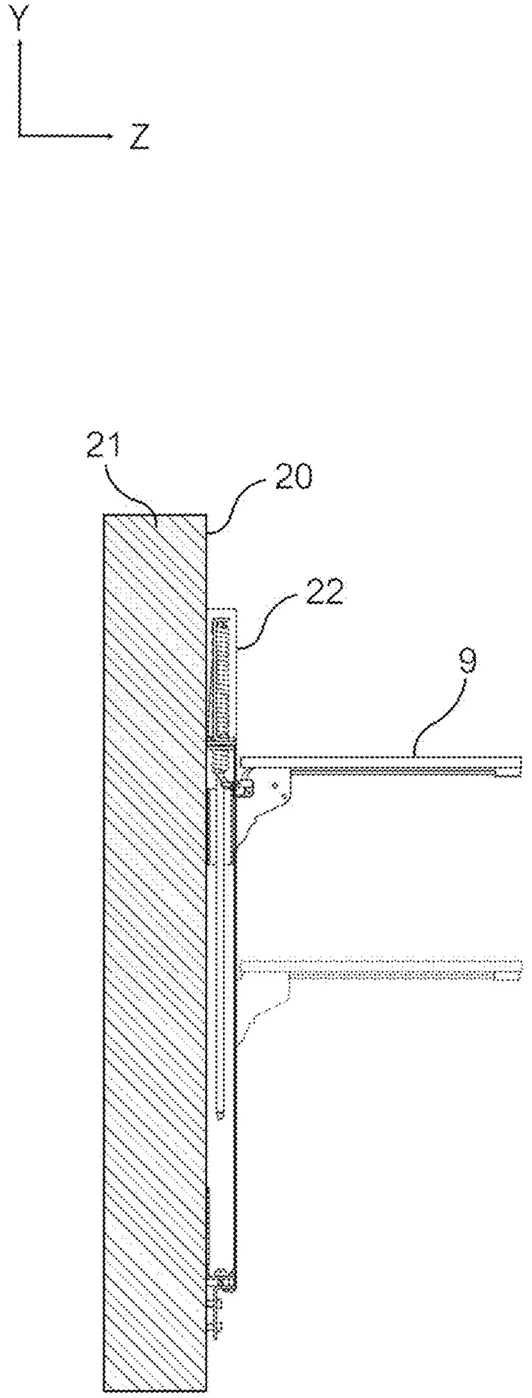
FIGS. 25*a-d* schematically illustrate example embodiments of mounting setups for an adjustment mechanism assembly according to the disclosed solution, as viewed from a side and with the adjustment mechanism depicted in the same cross-section as in FIG. 21.
Figure 25B:
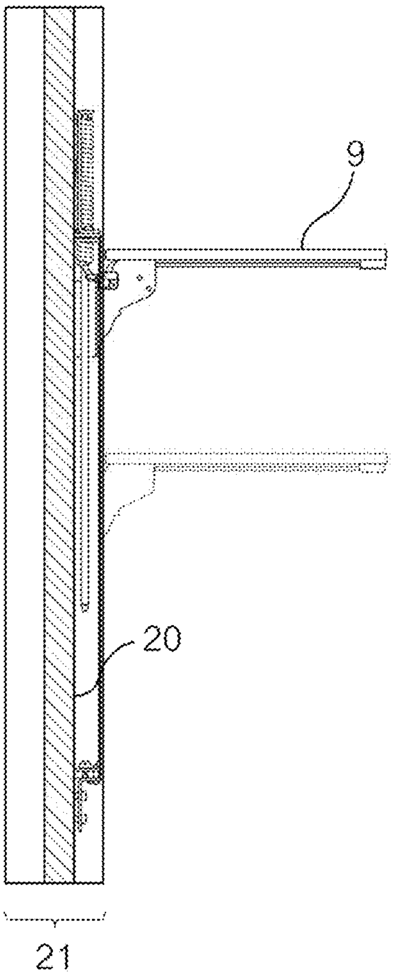
Figure 25C:
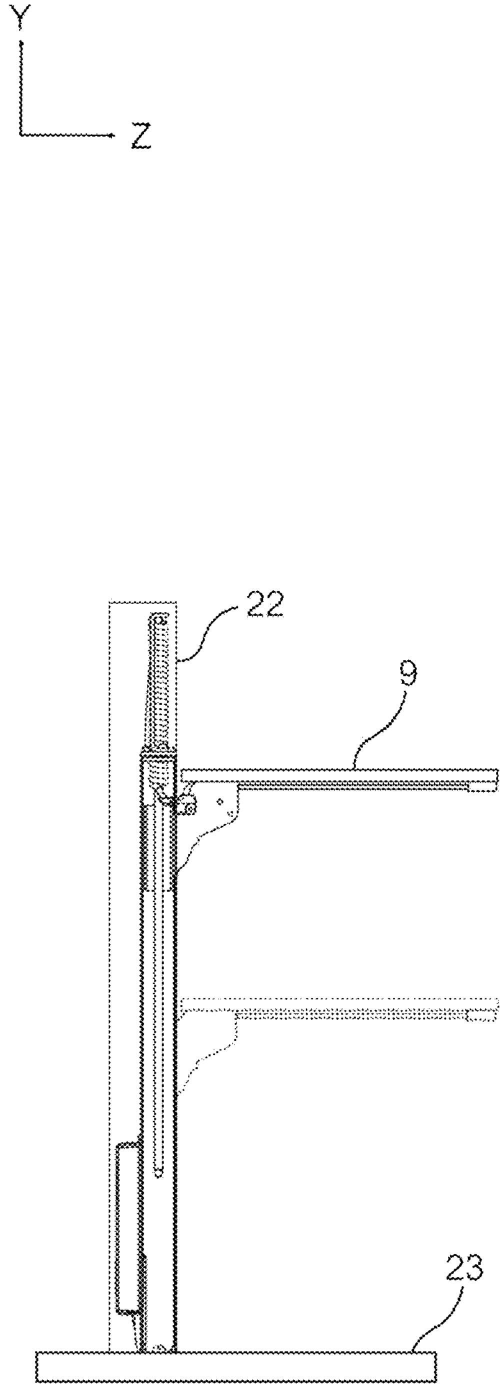

For example as shown in the embodiment of FIG. 25*c*, the adjustment mechanism assembly 1 may be configured to stand on a floor e.g. in applications in which a floor-standing or independently standing table setup is desired. In such embodiments, the adjustment mechanism assembly 1 may be coupled with or comprise a guiding element support member, such as a horizontally oriented support plate or a leg 23 or several such plates or legs 23, to support the adjustment mechanism assembly 1 in an upright position. Particularly, said guiding element support member or members may be adapted to support a vertical guiding element 6 or vertical guiding elements 6 of the adjustment mechanism assembly 1 in an upright position.

In certain embodiments, the adjustment mechanism assembly 1 may be enveloped at least partially with a concealment cover 22 to prevent inappropriate or accidental user interaction with parts, especially moving parts, of the adjustment mechanism assembly 1. Particularly, a concealment cover 22 may be employed in a floor-standing or independently standing setup, or in a setup where the adjustment mechanism assembly 1 is mounted on the outer surface of a wall (wall surface-mounted setup), for example as shown in the embodiments of FIG. 25*c* and FIG. 25*a*, respectively.

In certain embodiments, the adjustment mechanism assembly 1 is mounted to a mounting surface 20. The mounting surface may be for example a wall, for example a surface of a wall, as shown for example in the embodiment of FIG. 25*a*.

In certain embodiments, the adjustment mechanism assembly 1 may be embedded within a wall or wall structure 21 such that a portion of the work surface support element(s) 8 extend(s) from within the wall structure 21 (or the wall structure presented in the foregoing with reference to FIGS. 1-18) for connection with a work surface 9, for example as shown in the embodiment of FIG. 25*b*. Such an arrangement is advantageous as the vertical guiding element(s) 6 in particular do not consume any space from the working area in which the work surface 9 is installed. Such an arrangement is also advantageous as the vertical guiding element(s) 6 in particular do not interfere with humans, objects or acoustics within the working area in which the work surface 9 is installed. Such an arrangement is also advantageous as the vertical guiding element(s) 6 in particular do not interfere cleaning the surface of the wall structure 21 within which the adjustment mechanism assembly 1 is embedded.

The wall to which the adjustment mechanism assembly may be mounted, for example by attaching it to a wall surface or by embedding it within the wall structure 21, may be, for example, a wall of a building or a wall of an enclosed sound-attenuating portable structure such as an office booth or an office pod (such as the soundproof booth 100 or similar).

For mounting the adjustment mechanism assembly 1 comprising the vertical guiding element(s) 6, the vertical guiding element(s) 6 may be equipped with e.g. fixture apertures or integral mounting fixings. Alternatively, or in addition, the adjustment mechanism assembly 1 may comprise one or more mounting support elements 5 via which the adjustment mechanism assembly 1 can be attached to a wall structure 21, either onto a surface or within it. Examples of mounting support elements 5 are shown for example in the embodiment of FIG. 19. The mounting support element(s) may be connected to the vertical guiding element(s) 6 such that the mounting support element(s) 5 may provide positional rigidity to the vertical guiding element(s) 6. Such mounting support element(s) 5 may be horizontally aligned.

In certain embodiments, for example as illustrated in the embodiment of FIG. 19, the adjustment mechanism assembly 1 comprises two horizontal or essentially horizontal mounting support elements 5*a*, 5*b* (or mounting arrangements 161*a* and/or 161*b* in the foregoing) each of which is connected to a vertical guiding element 6. For example, as shown in the embodiment of FIG. 19 comprising two vertical guiding elements 6*a*, 6*b*, the adjustment mechanism assembly 1 may comprise two horizontal or essentially horizontal mounting support elements 5*a*, 5*b* each of which is connected to each of two vertical guiding elements 6*a*, 6*b*. Particularly, as shown in the embodiment of FIG. 19 comprising two vertical guiding elements 6*a*, 6*b*, the adjustment mechanism assembly 1 may comprise one upper horizontal mounting support element 5*a* which is connected to the upper end of each of the two vertical guiding elements 6*a*, 6*b*, and one lower horizontal mounting support element 5*b* which is connected to the lower end of each of the two vertical guiding elements 6*a*, 6*b*. Such an arrangement is advantageous in that it offers high dimensional and structural rigidity as the horizontal support elements 5*a*, 5*b* and the vertical guiding elements 6*a*, 6*b* form a horizontally and vertically extending structure with spatially spaced out connecting points, and as the mounting points of the adjustment mechanism 1 can be spatially spaced out on the plane of the wall structure 21.

In certain embodiments, for example as shown in the embodiment of FIG. 21, the vertical guiding element(s) 6 house an actuator such as a motor 31 to effect the movement of the work surface support element(s) 8. For example, such an actuator may effect the rotational movement of a threaded rod 30 and, consistent with what has been described above, thus effecting the movement of the work surface support element(s) 8. To provide actuation signals and/or power to the actuator(s) such as motor(s) 31, the adjustment mechanical assembly 1 may comprise a control unit 7, for example as shown in the embodiment of FIG. 19.

To provide user convenience and especially in embodiments in which the control unit 7 is, for example together with the vertical guiding element(s) 6, embedded within a wall structure 21, a user of the adjustment mechanism assembly 1 is provided an electrical user interface 10, preferably within his or her immediate reach. Such an electrical user interface 10 may be provided, for example, within, on or under the work surface 9 such as a table top. The embodiment of FIG. 20, for example, shows an example installation of an electrical user interface 10 under the work surface 9. It is to be understood that in FIGS. 19 and 21 the electrical user interface is not illustrated with any respect to its physical positioning.

Figure 20:
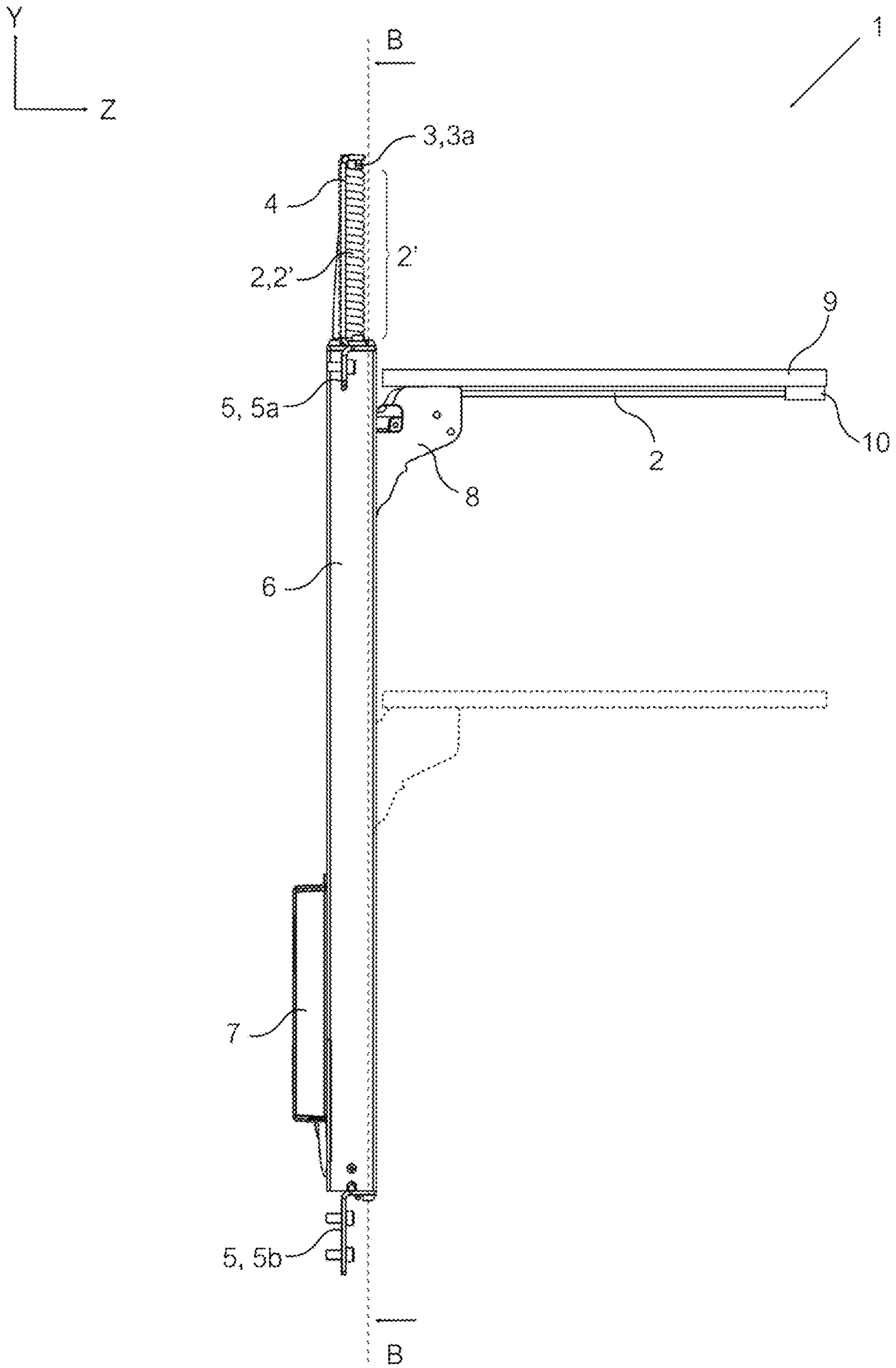
FIG. 20 schematically illustrates the adjustment mechanism assembly of FIG. 19 and a work surface with a cable connected electrical user interface connected thereto, as viewed from a side, and wherein work surface movement is illustrated by way of depicting another exemplary position for the work surface with dashed lines.
Figure 24:
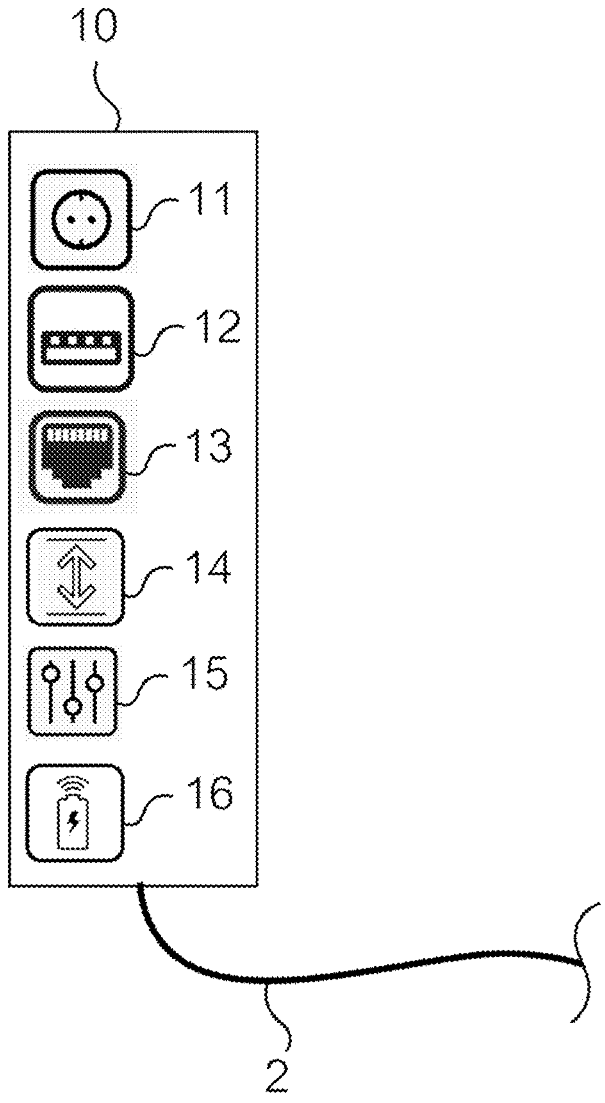
FIG. 24 schematically illustrates possible functionalities of an electrical user interface.

FIG. 24 shows an example of an electrical user interface 10. The electrical user interface 10 may comprise a height adjustment control 14, for example in the form of an "upwards" button and a "downwards" button or an equivalent control interface to provide corresponding movement command signals to effect the movement of the work surface support element(s) 8 and thus the movement of the work surface 9. Such movement command signals typically travel through from the electrical user interface 10 to the control unit 7 which, in turn, provides actuation signals and/or power to the actuators effecting the movement of the work surface support element(s) 8, as schematically illustrated in the embodiment of FIG. 20 for example.

As illustrated for example in FIG. 24, the electrical user interface 10 may comprise in addition to the height adjustment control 14, for example,

- an electrical socket 11 to provide electricity to (the user's) appliances such as a laptop computer charger; and/or
- a data connection socket 12 such as an USB interface socket to provide data connectivity to the control unit 7 and/or to devices external to the adjustment mechanism assembly 1; and/or
- a network connection socket 13 such as an Ethernet network port to provide (the user with) a network connectivity; and/or
- a wireless charging element 16 to provide the user with wireless charging of e.g. a mobile phone on the work surface 9 without a need of a charging cable; and/or
- another control 15 to control other functionalities of the adjustment mechanism assembly 1 such as the speed with which the work surface 9 moves when moved and/or to control functionalities external to the adjustment mechanism assembly 1 such as the lighting and/or the ventilation of a working area, such as a sound-insulation booth, in which the work surface 9 resides.

The electrical user interface 10 may be connected to the control unit 7 with an electrical cable 2, as schematically illustrated in FIG. 19 for example.

It is advantageous to convey or arrange the cable 2 at least partially within the elements of the adjustment mechanism assembly 1. This may for example prevent damage to the cable 2 due to user interference of contact with other human beings or foreign objects and to provide user with convenience without disturbing and interfering cable(s) 2.

In certain embodiments, a portion of (the length of) the cable 2 is conveyed or arranged within the vertical guiding element 6. A portion (of the length) of the cable 2 may optionally be conveyed within other elements of the adjustment mechanism assembly 1 as well, such as within or concealed by a mounting support element 5.

In certain embodiments, the cable 2 enters into the inside of the vertical guiding element 6 at the work surface support element 8, for example as shown in the embodiment of FIG. 22. Particularly, the route of the cable 2 from the electrical user interface 10 to the control unit 7 or an equivalent connection point may be arranged such that on its way from the electrical user interface 10 towards the control unit 7, the cable 2 enters into the inside of the vertical guiding element 6 at the work surface support element 8.

Figure 26A:
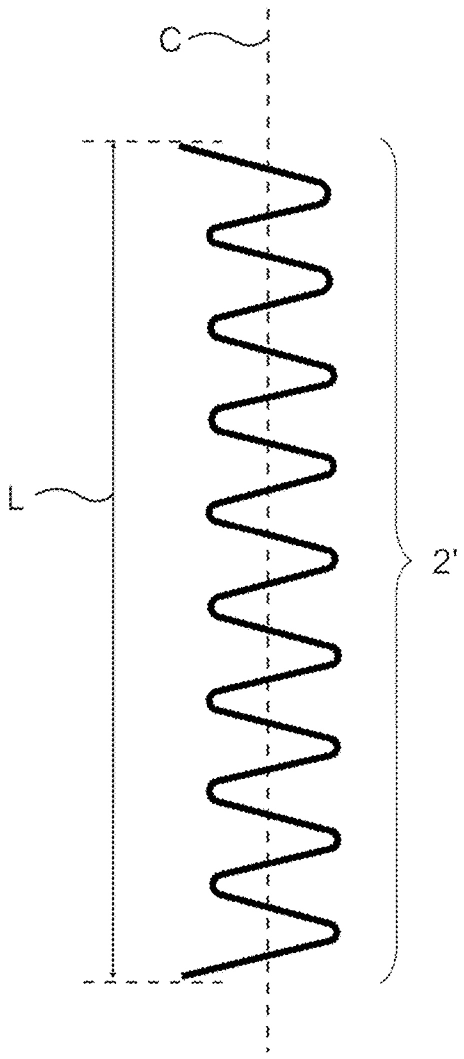
FIG. 26*a* schematically illustrates the effective length and the central axis of a spiraled portion of a cable in an extended state of the spiraled portion.
Figure 26B:
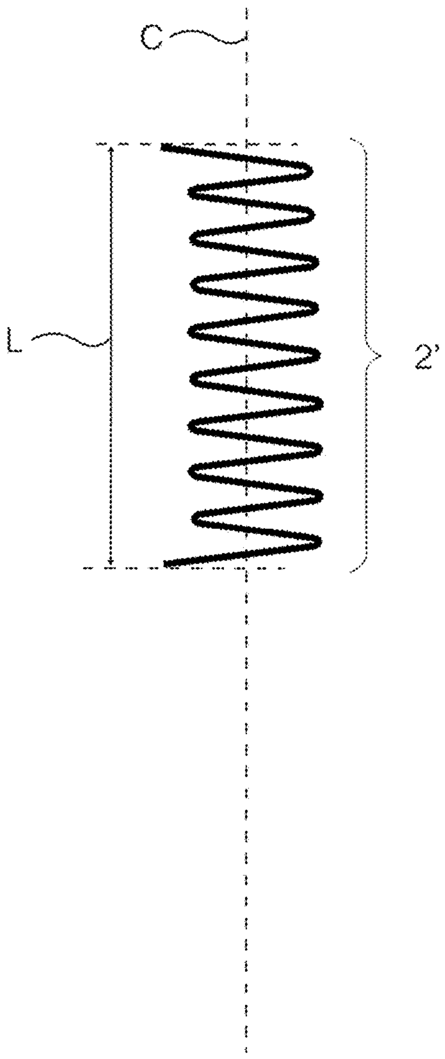
FIG. 26*b* schematically illustrates the effective length and the central axis of a spiraled portion of a cable in a contracted state of the spiraled portion and with the absolute length of the portion of the cable forming the spiraled portion being the same as in FIG. 26*a*.

In certain embodiments, the vertical guiding element 6 of the adjustment mechanism assembly 1 within which a portion of the cable 2 is conveyed, comprises a vertical support member 3 at least partly within the vertical guiding element 6 for providing guidance and/or support for a portion of the cable 2. Such guidance may be provided for example so that a portion of the cable 2 is arranged in a spiral or helix, and that spiraled portion of the cable is supported with respect to its central axis or in an upright position by the vertical support member 3. That portion of the cable is hereafter referred to as a spiraled portion 2' of the cable 2. The vertical support member 3 provides or is arranged to provide support for the spiraled portion 2' of the cable 2 so that the spiraled portion 2' may remain aligned with respect to its central axis C, as illustrated for example in FIGS. **26*a* and 26*b*. The vertical support member 3 is arranged to provide support for the spiraled portion 2' of the cable 2 also when the spiraled portion 2' alternates between its contracted state, as illustrated in FIG. 26*b*, and its extended state, as illustrated in FIG. 26*a***.

In certain embodiments, the vertical support member 3 is or comprises a rod **3*a*, and the spiraled portion 2' of the cable 2 may be spiraled or wound around the rod 3*a*, for example as shown in the embodiments of FIGS. 19-23. Such a rod 3*a* may be solid, i.e. devoid of any internal cavities, which has the advantage of being structurally highly rigid. Alternatively, such a rod 3*a*** may be hollow, i.e. tubular, which has the advantage of being light while structurally sufficiently rigid.

An adjustment arrangement comprising a spiraled portion 2' of the cable 2 and a vertical support member 3 supporting the spiraled portion 2' is advantageous in that during the upwards and downwards travel of the work surface support element 8 connected to the vertical guiding element 6, the spiraled portion 2' of the cable 2 extends and contracts, while maintaining the orientation of its central axis C, along with the movement of the work surface support element 8, enabling variable effective length L for the spiraled portion 2' of the cable 2 depending on the vertical position of the work surface support element 8. The vertical support member 3 provides the advantage of preventing the spiraled portion 2' of the cable 2 from coming into contact with the internal wall(s) and/or other internal parts such as a threaded rod 30 optionally comprised in the vertical guiding element 6 and/or a mounting support element 5 during movement of the cable 2, reducing or even eliminating wear on and/or damage of the cable 2. Furthermore, the vertical support member 3 guides and/or supports the spiraled portion 2' of the cable 2 such that it may occupy just little space within the vertical guiding element 6 as the spiraled portion 2' stays aligned with respect to its central axis C (i.e. by preventing tilting of the spiraled portion 2' of the cable 2).

As schematically illustrated in FIGS. **26*a* and 26*b*, the variable effective length L for at least a portion of the cable 2—in the above-mentioned embodiments for the spiraled portion 2' of the cable 2—is advantageous because loosely hanging cable portions will not be formed when the work surface support element 8 is moved away from a position in which a great length for the cable 2 is required to a position requiring less cable 2 length. Also, the variable effective length L for at least a portion of the cable 2—in the above-mentioned embodiments for the spiraled portion 2' of the cable 2—provides a simple and convenient way for arranging portion of the cable 2 allowing or following movement of the work surface support element 8. Thus, with variable effective length L for at least a portion of the cable 2, there is no need to make or provide a larger and/or more complex cable-housing element to accommodate temporary surplus length formed when the work surface support element 8 is moved away from a position in which a great length for the cable 2 is required to a position requiring less cable 2 length, as would be the case with a cable carrier track-based solution, for example. Moreover, with variable effective length L of at least a portion of the cable 2, risk for cable damage is reduced as loosely hanging temporary surplus length of the cable will not be formed within the vertical guiding element 6**.

In certain embodiments, the support member 3 extends both within and outside the vertical guiding element 6. Such an arrangement is advantageous in that at least a portion of the spiraled portion 2' of the cable 2 may reside outside the vertical guiding element 6 while being supported by the vertical support member 3, thus providing more range of movement for the work surface support element 8 without the spiraled portion 2' of the cable 2 becoming a movement-restricting obstacle for the worksurface support element 8, even when a large movement range for the work surface support element 8 is provided.

In certain embodiments wherein the vertical support element 3 extends from within the vertical guiding element 6 to outside the vertical guiding element 6, the vertical guiding element 6 may be a rod-type support member 3,3*a*, for example as shown in the embodiments of FIGS. 19-23.

In embodiments in which the spiraled portion 2' of the cable 2 resides, while being supported by the vertical support element 3, at least partly outside the vertical guiding element 6, the vertical guiding element 6 may comprise an aperture 40 at one vertical end of the vertical guiding element 6, such as an upper end of the vertical guiding element 6, through which aperture 40 the vertical support member 3 and optionally the spiraled portion 2' of the cable 2 extend to outside the vertical guiding element 6. Such an aperture-based arrangement as just described is advantageous in that it allows the spiraled portion 2' of the cable 2 to reside partially inside the vertical guiding element 6 and partially outside the vertical guiding element 6 while allowing a large range of movement for the spiraled portion 2' to expand and contract. Such an arrangement also enables a setup in which the entire spiraled portion 2' may reside outside the vertical guiding element 6 in its contracted state (c.f. also FIG. 26*b*) while allowing it to extend into the inside of the vertical guiding element 6 in its extended state (c.f. also FIG. 26*a*).

Figure 23:
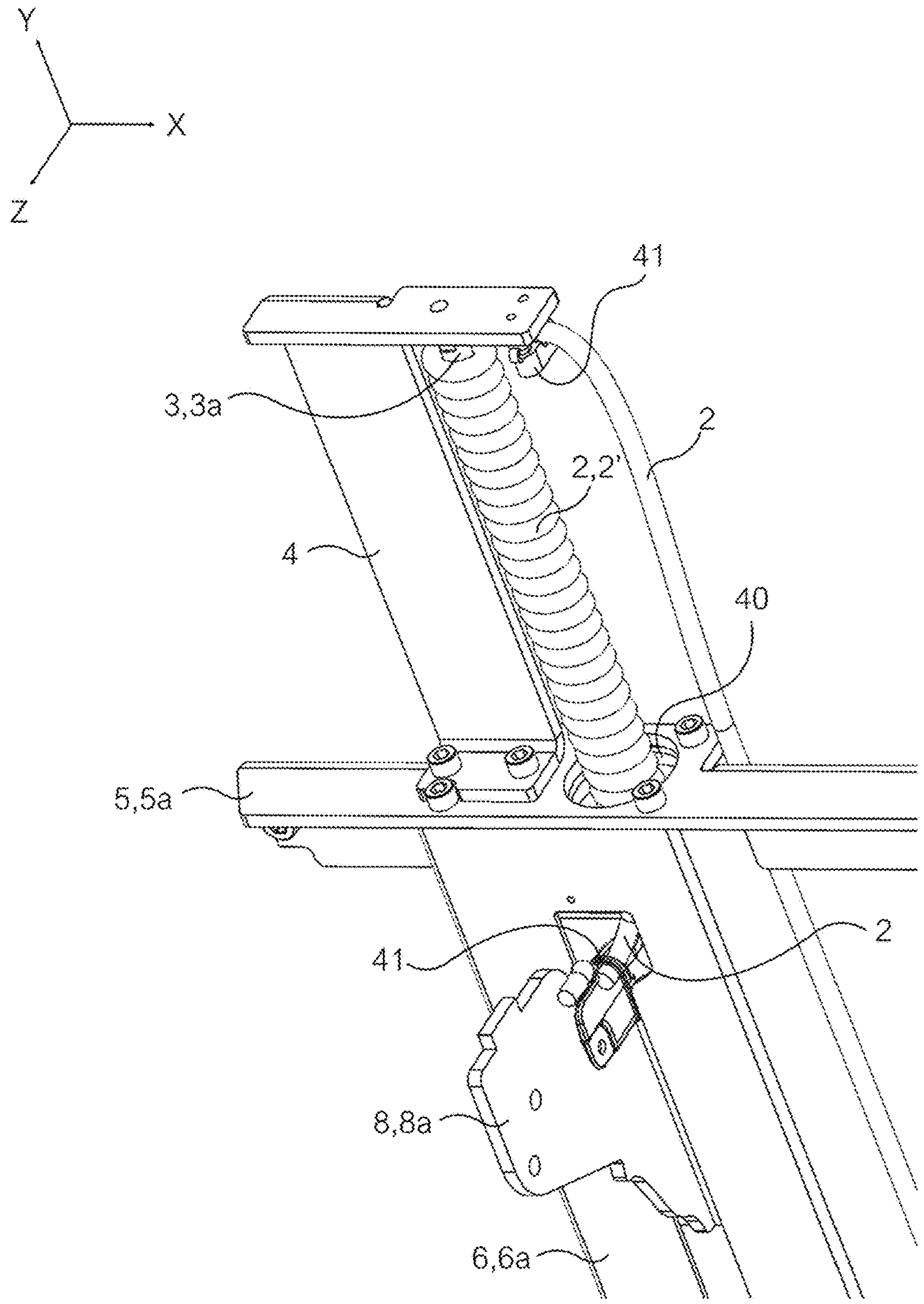
FIG. 23 schematically illustrates a partial enlargement of the adjustment mechanism assembly of FIG. 19 as depicted diagonally from above.

In embodiments in which the adjustment mechanism assembly 1 comprises a mounting support element 5, the mounting support element 5 may be attached to the same vertical end of the vertical guiding element 6 in which said aperture 40 resides. The mounting support element 5 may be provided with an aperture that coincides with the aperture 40 of the vertical guiding element 6 (coinciding aperture), for example as shown in the embodiment of FIG. 23. In FIG. 23, reference sign 40 refers to both the aperture of the vertical guiding element 6 and a coinciding aperture of the mounting support element 5.

Preferably, the aperture 40 of the vertical guiding element 6 and/or the coinciding aperture 40 of the mounting support element 5 has (have) a diameter which is greater than the outer diameter of the spiraled portion 2' of the cable 2 to enable the spiraled portion 2', supported by the support member 3, to expand and contract without restriction or obstruction by the aperture(s) 40. The aperture 40 of the vertical guiding element 6 and the coinciding aperture 40 of the mounting support element 5 may have different diameters.

In certain embodiments, the adjustment mechanism assembly 1 comprises a support element 4 arranged to support the vertical support member 3 on the outside of the vertical guiding element 6 to provide positional and alignment stability for the vertical support member 3. Such positional and alignment stability is desirable to prevent the support member 3 from changing position and/or alignment which could for example cause the cable 2 to get into touch with the inner surface or internal components of the vertical guiding element 6 and/or the optional mounting support element 5, creating a risk for cable 2 damage. In certain embodiments, the end of the support member 3 extending to outside the guiding element 6 is connected to a support element 4 provided outside the vertical guiding element 6 to provide support for the portion of the vertical guiding member 3 extending outside the vertical guiding element 6.

In certain embodiments, wherein the adjustment mechanism assembly 1 comprises a support element 4, the vertical support member 3 may be a rod-type support member 3,3*a*, for example as shown in the embodiment of FIG. 23.

The support element 4 may be an independent element connected, for example, to the vertical guiding element 6 or a mounting support element 5, preferably with the benefit of positional adjustment via the connection by way of, for example, elliptical bolt holes. Alternatively, the vertical guiding element 6 or a mounting support element 5 may comprise the support element 4 as a structural feature with the benefit of increased structural rigidity due to structural integrity.

With respect to dimensioning the vertical support member 3, it is preferred that that end of the support member 3 which resides within the vertical guiding element 6 extends so far, i.e. to such a vertical position, that it still surpasses the work surface support element 8 when the work surface support element 8 is at a position that, in a certain application, is arranged to be its farthest position from the other or opposite end of the vertical support member 3. In other words, the vertical support member 3 should advantageously be, within the vertical guiding element 6, so long that the spiraled portion 2' of the cable 2 remains supported by the vertical support member 3 even when fully extended so that when the spiraled portion 2' of the cable 2 thereafter contracts, there is no risk of a portion of the spiraled portion 2' of the cable 2 to contract past the vertical support member 3.

It is preferred that the cable 2 does not undergo travel along its path (outside the spiraled portion 2' of the cable 2), e.g., does not travel towards or away from the electrical user interface 10 or the control unit 7 (or an equivalent connecting point). This is preferred because such travel could create tension at either end of the cable 2, risking the cable 2 becoming detached from its connection at either end or becoming damaged. For this purpose, the cable 2 is advantageously secured in place along its path e.g. with strain reliever fixtures.

In certain embodiments, for example as shown in the embodiment of FIG. 23, to prevent such travel of (at least a portion of) the cable 2 as described just above, the work surface support element 8 and/or the support element 4 for the vertical support member 3 is (are each) equipped with a strain reliever 41 which provides a fixing point for the cable 2. Such an arrangement is beneficial, especially when both the work surface support element 8 and the support element 4 for the vertical support member 3 are each equipped with a strain reliever 41, because the spiraled portion 2' of the cable 2 may extend and contract between the strain relievers 41 without any restraint created by fixing points whereas the cable 2 thereafter, i.e. beyond the strain relievers 41, remains immovable along its path.

Advantageously, the strain reliever 41 at the work surface support element 8 may be configured such that it envelops the cable 2 at this fixing point, for example as shown in the embodiment of FIG. 23, to protect the cable 2 for example from hitting the sides of the silt through which the work surface support element 8 extends and the cable 2 enters into the vertical guiding element 6.

Figure 25D:
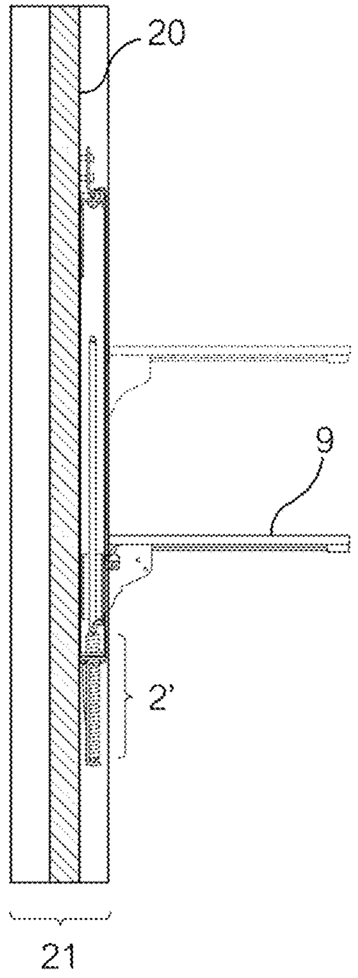

While most of the illustrations in the Figures depict the vertical support member 3 to extend to above the vertical guiding element 6, the same principles as described above apply, mutatis mutandis, to cases in which the support member 3 extends to below the vertical guiding element 6, for example as illustrated in the embodiment of FIG. 25*d*. Such an implementation has e.g. the advantage that the spiraled portion 2' of the cable 2 contracts easily and with less or no pushing force required, as pulled by gravity. It may also be that dimensional requirements in a usage context of the adjustment mechanism assembly 1 require the space occupied by that part of the support member 3 which extends to outside the vertical guiding element 6, to reside below, rather than above, the vertical guiding element 6, i.e. when there is a dimensional requirement that the adjustment mechanism assembly 1 terminates at its top at the upper end of the vertical guiding element(s) 6, as may be in the case of a floor-standing work desk, for example.

The cable 2 may comprise more than one or several electricity- and/or signal-conveying wires while adhering to the principles described above. The cable 2 can take the form of a bundle of individual cables while adhering to the principles described above.

The above-described embodiments and examples are intended to explain the general idea of the disclosed solution. Therefore, such examples are not to be taken as exhausting the ways in which the general idea of the disclosed solution may be implemented.

Without limiting the scope and interpretation of the patent claims, certain technical effects of one or more of the example embodiments disclosed herein are listed in the following. A technical effect is improved fireproofing. A further technical effect is enabling efficient soundproofing by a reasonably thin wall structure. A further technical effect is improved fireproofing simultaneously with enabling efficient soundproofing by a reasonably thin wall structure. A further technical effect is a non-disturbing positioning and adjustment of a work surface.

In certain embodiments, a reasonably thin wall structure is provided with an adjustment mechanism so that an interior wall surface of the soundproof booth concerned is free from protruding adjustment legs which would be in the way of the user(s), but the adjustment mechanism is basically buried behind a visible part of the wall structure without so much compromising with soundproofing, fireproofing, nor with increasing the wall thickness. In certain embodiments, due to a recessed structure in the region of the adjustment mechanism/legs, the need for making holes in the wall behind the adjustment mechanism is avoided. In certain embodiments, the whole wall structure behind the adjustment mechanism bends backwards enabling the layered structure of the wall behind the adjustment mechanism to remain invariant over the whole width of the wall. In certain embodiments, there are holes or cavities within the upholstery panel accommodating the adjustment mechanism that protrudes or extends from the recessed structure enabling the adjustment mechanism to remain wholly within the wall structure thus consuming no space within the interior of the booth.

A further technical effect is good acoustic performance due to enabling placement of a uniform or unitary upholstery panel as an interior surface of the booth. A further technical effect is providing an easy and quick assembly of a soundproof booth. An additional technical effect is providing an assembly of a soundproof booth without tools such as spanners and screwdrivers.

Various embodiments have been presented. It should be appreciated that in this document, words "comprise", "include", and "contain" are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A wall assembly for a soundproof space, comprising:
- a first layer comprising a sound absorbing material;
- a vertically oriented elongated mounting element behind or embedded into the first layer, the mounting element providing an adjustment groove for a vertically adjustable work surface; and
- an incombustible surface behind the first layer,
- wherein the incombustible surface comprises a local recess in a region of the mounting element and behind the mounting element.

2. The wall assembly of claim 1, comprising a slit providing access to the adjustment groove.

3. The wall assembly of claim 2, comprising a support for the work surface, the support being slidably attached to the adjustment groove and extending through the slit to the outside of the first layer.

4. The wall assembly of claim 1, comprising:
- a wall module providing said incombustible surface, and the said vertically oriented elongated mounting element being attachable or attached to the wall module.

5. The wall assembly of claim 1, wherein the incombustible surface has a raised edge forming its end portion, the mounting element being attached to the end portion by a mounting arrangement.

6. The wall assembly of claim 1, comprising an air layer in between the mounting element and the incombustible surface for maintaining a distance in between the mounting element and the incombustible surface.

7. The wall assembly of claim 1, comprising a first wall element of sheet material providing said incombustible surface.

8. The wall assembly of claim 7, wherein the material of the first wall element is sheet metal.

9. The wall assembly of claim 7, comprising a second wall element of sheet material forming a wall module with the first wall element, wherein the first and second wall elements are joined together at end portions of the module to form an enclosure therebetween, the enclosure being formed of the sheet material.

10. The wall assembly of claim 9, comprising sound absorbing material within the enclosure.

11. The wall assembly of claim 10, comprising:

an air layer within the enclosure in between the sound absorbing material and either of the first and the second wall elements.

12. The wall assembly of claim 1, comprising:

a vertical support member extending vertically from within the mounting element to outside the mounting element;

an electrical cable wound around the vertical support element, the vertical support element allowing the electrical cable to alternate between its contracted and extended states.

13. A soundproof booth, comprising the wall assembly of claim 1.

14. The soundproof booth of claim 13, comprising structural parts, including said wall assembly, attached to each other to form a structure encircling the soundproof space.

15. The soundproof booth of claim 14, comprising a door frame attached to said encircling structure for attaching a door.

16. The soundproof booth of claim 1, wherein the first layer faces the soundproof space.

* * * * *